(12) United States Patent
Kagaya et al.

(10) Patent No.: US 11,927,528 B2
(45) Date of Patent: Mar. 12, 2024

(54) LIGHT SOURCE DEVICE AND OPTICAL DEVICE

(71) Applicant: Kahoku Lighting Solutions Corporation, Miyagi (JP)

(72) Inventors: Masahito Kagaya, Miyagi (JP); Motohiro Sakai, Miyagi (JP)

(73) Assignee: Kahoku Lighting Solutions Corporation, Miyagi (JP)

( * ) Notice: Subject to any disclaimer, the term of this patent is extended or adjusted under 35 U.S.C. 154(b) by 70 days.

(21) Appl. No.: 17/608,117

(22) PCT Filed: May 11, 2020

(86) PCT No.: PCT/JP2020/018829
§ 371 (c)(1),
(2) Date: Nov. 1, 2021

(87) PCT Pub. No.: WO2020/230757
PCT Pub. Date: Nov. 19, 2020

(65) Prior Publication Data
US 2022/0221396 A1    Jul. 14, 2022

(30) Foreign Application Priority Data

May 13, 2019    (JP) ................................ 2019-090730

(51) Int. Cl.
*G01N 21/31*    (2006.01)
(52) U.S. Cl.
CPC ....... *G01N 21/31* (2013.01); *G01N 2201/061* (2013.01); *G01N 2201/062* (2013.01)
(58) Field of Classification Search
CPC ...... G01N 21/31; G01N 2201/061; G01J 3/10
See application file for complete search history.

(56) References Cited

U.S. PATENT DOCUMENTS

2006/0226336 A1 * 10/2006 York .................... G02B 6/4298
250/206
2013/0265795 A1    10/2013 Chalmers

FOREIGN PATENT DOCUMENTS

CN        101238359 A    8/2008
CN        101461286 A    6/2009
(Continued)

OTHER PUBLICATIONS

Machine Translation of 2016098729 (Year: 2016).*
(Continued)

*Primary Examiner* — Dominic J Bologna
*Assistant Examiner* — Huy Phillip Pham
(74) *Attorney, Agent, or Firm* — Nakanishi IP Associates, LLC

(57) ABSTRACT

An optical measuring device which measures absorbance of a measuring object at a plurality of wavelengths, the optical measuring device comprising: a light source device; and an optical measuring part which irradiates the measuring object with light from the light source device and performs optical measurement of the measuring object based on light from the measuring object, wherein the light source device has a first light source, a second light source, and a light source control part which drives the first light source and the second light source, the light source control part performs heating and light emitting drive of the first light source, and drives the second light source, and the light source device irradiates the measuring object with combined light of light from the first light source and light diffused and reflected on a surface of the filament.

18 Claims, 26 Drawing Sheets

(56) References Cited

FOREIGN PATENT DOCUMENTS

| JP | S63-182530 A | 7/1988 | | |
|---|---|---|---|---|
| JP | 3137726 U | 12/2007 | | |
| JP | 2008-002849 A | 1/2008 | | |
| JP | 2012-080949 A | 4/2012 | | |
| JP | 2016-040528 A | 3/2016 | | |
| WO | 2007/113751 A1 | 10/2007 | | |
| WO | WO-2007113751 A1 * | 10/2007 | ............ | H05B 35/00 |
| WO | 2011/142123 A1 | 11/2011 | | |
| WO | 2016-098729 A1 | 6/2016 | | |
| WO | WO-2016098729 A1 * | 6/2016 | | |

OTHER PUBLICATIONS

International Search Report issued in PCT/JP2020/018829 dated Jul. 7, 2020 with English Translation (5 pages).
Written Opinion of International Searching Authority issued in PCT/JP2020/018829 dated Jul. 7, 2020 with English Translation (11 pages).
International Preliminary Report on Patentability Chapter II issued in PCT/JP2020/018829 dated Jun. 29, 2021 with English Translation (6 pages).
Office Action issued in Chinese Patent Application No. 202080033341.2 dated Dec. 27, 2023, with English Translation of Substantial Part (13 pages).

* cited by examiner

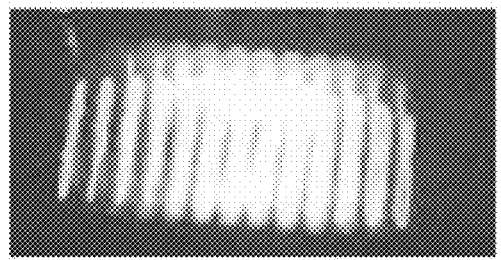
Fig. 10(c) COMBINED LIGHT
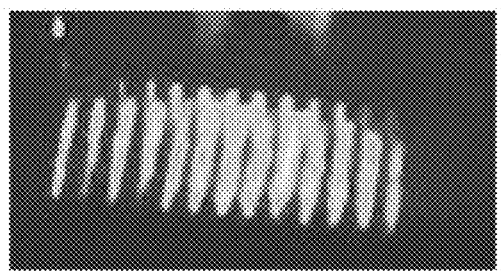
Fig. 10(b) LED SCATTERED LIGHT IN FILAMENT
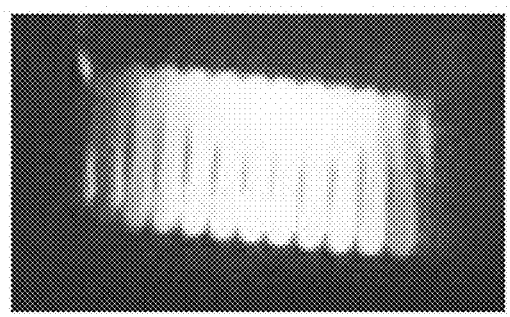
Fig. 10(a) FILAMENT LIGHT EMISSION IMAGE

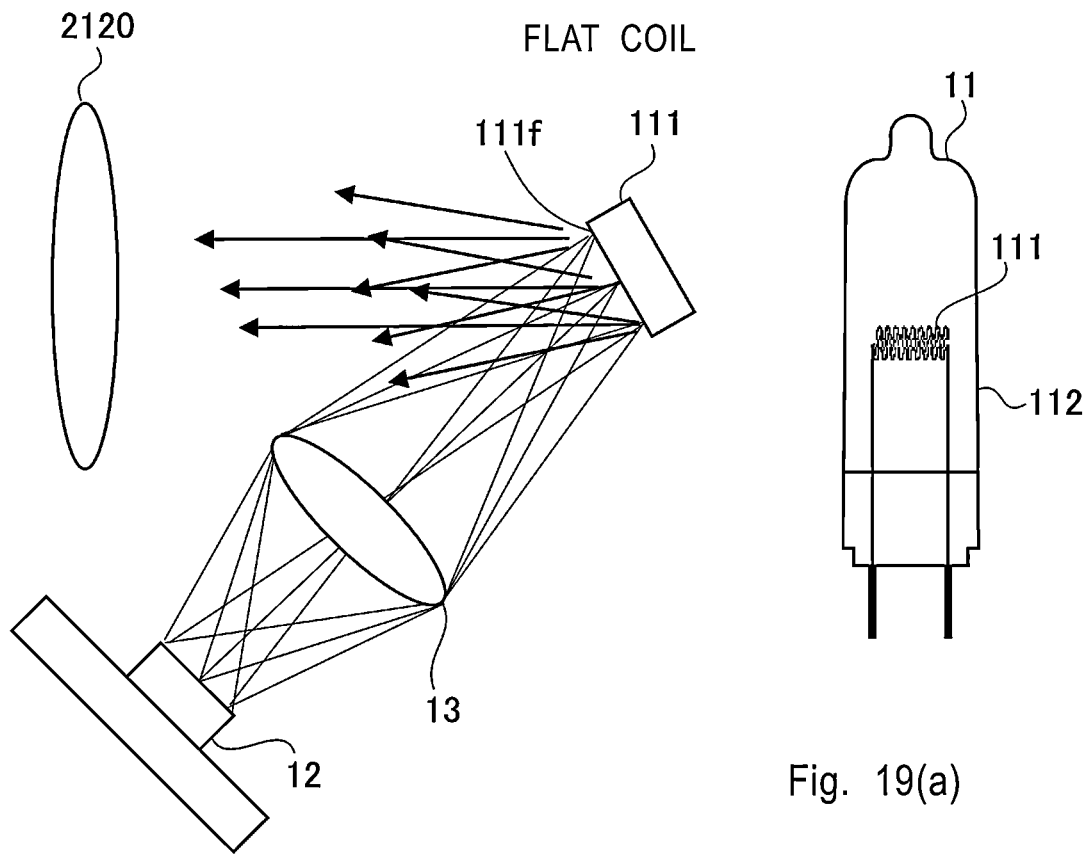
FLAT COIL
Fig. 19(c)
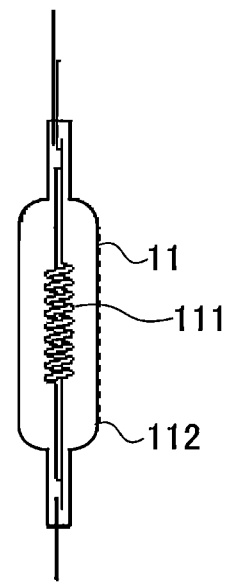
Fig. 19(a)
Fig. 19(b)

ROUND COIL
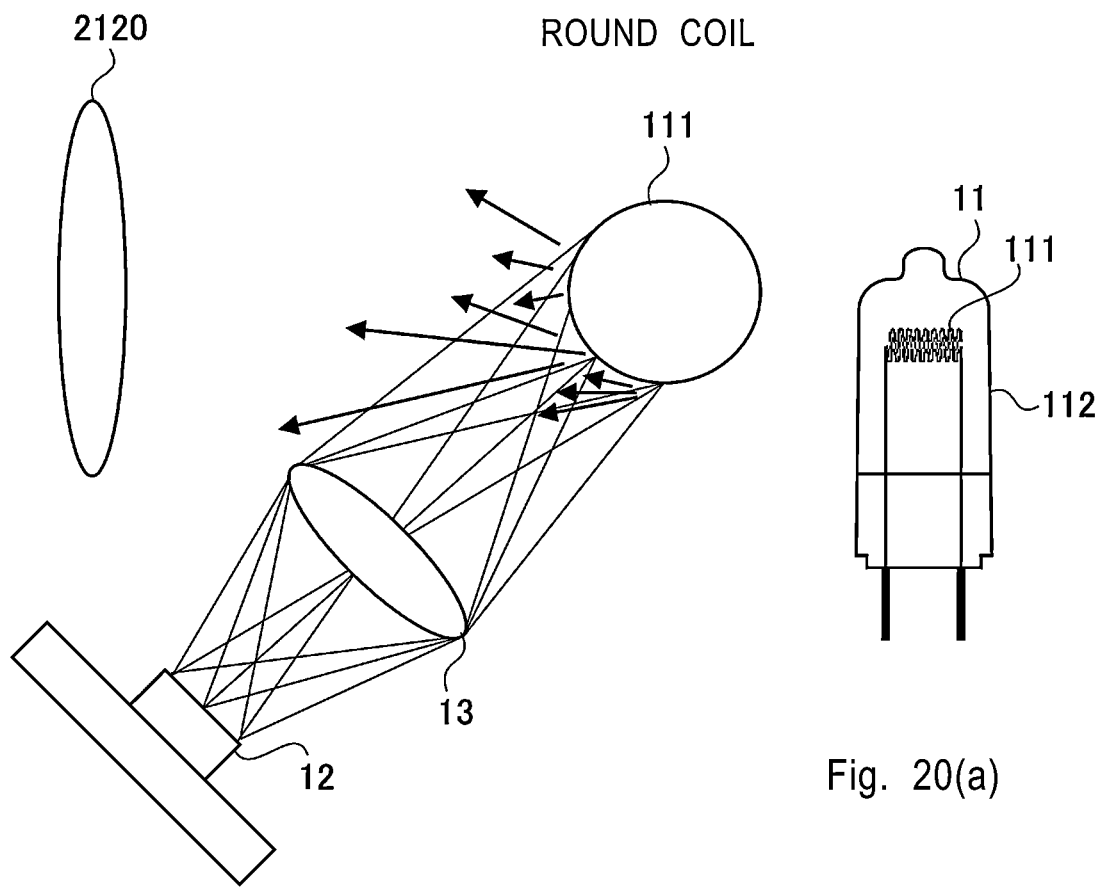
Fig. 20(c)
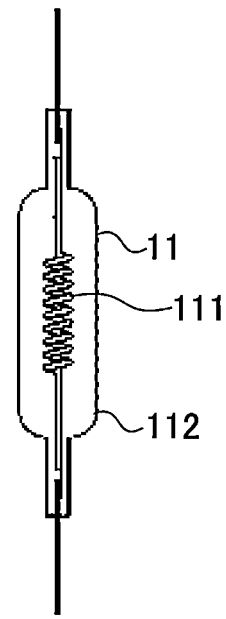
Fig. 20(a)
Fig. 20(b)

LIGHT SOURCE DEVICE AND OPTICAL DEVICE

TECHNICAL FIELD

The present invention relates to a light source device and an optical device.

BACKGROUND ART

There is known an optical measuring device such as an analyzing device or the like which measures optical characteristics of a specimen accommodated in a container (see, e.g., PTL 1 and PTL 2).

As a light source of a typical optical measuring device, for example, a halogen lamp or the like is used. In this halogen lamp, a filament performs high temperature light emitting by electrification. The spectrum of light from the filament which has performed high temperature light emitting is determined by the temperature of the filament according to light emission principles of black body radiation. In the halogen lamp, the temperature of the filament can be set to a temperature higher than that in an incandescent lamp, and the halogen lamp has a color-developing light which is bright, close to sunlight, and has a continuous spectrum, and moreover the halogen lamp is suitable as the light source for the optical measuring device.

CITATION LIST

Patent Literature

[PTL 1] Japanese Patent Application Publication No. 2008-2849
[PTL 2] Japanese Patent Application Publication No. 2016-40528

SUMMARY OF INVENTION

Technical Problem

However, for example, when a current value of a current to the filament is reduced and the temperature of the filament is set to a low temperature in order to increase the life of the lamp, there may be a case where, in light emitted from the filament in an electrification state, the intensity (light amount) of light in a wavelength band required for optical measurement or the like is insufficient, particularly the intensity of light in a short wavelength band of about 300 nm to 500 nm is insufficient.

Incidentally, PTL 2 describes an analyzing device which analyzes an amount of an ingredient contained in a sample by combining light from a halogen lamp and light from an ultraviolet LED light source by a prism including a reflecting part which reflects light in an ultraviolet region, and irradiating the sample with the combined light. However, in the analyzing device described in PTL 2, complicated optical axis adjustment is required for the halogen lamp and the ultraviolet LED light source, etc. For example, in an optical device having a dichroic mirror DM shown in FIG. 26, light emitted from a filament 111z of a halogen lamp 11z is radiated to a sample 91 via a measuring optical system lens LE1 and the dichroic mirror DM, light emitted from an LED light source 12z passes through a lens LE2, and is reflected by the dichroic mirror DM which is arranged between the sample 91 and the lens LE1, and moreover is radiated to the sample, and light having passed through the sample 91 enters a measurement spectrometer 220z via a measuring optical system-side lens LE3. That is, in an example shown in FIG. 26, complicated optical axis adjustment is required for the dichroic mirror DM, the LED light source 12z, the halogen lamp 11z, and the lenses LE1, LE2, and LE3.

Solution to Problem

A light source device of the present invention includes at least the following configuration.

A light source device includes a first light source, and
a second light source capable of irradiating the first light source with light having a wavelength band narrower than a wavelength band of light by the first light source, wherein
the first light source is configured to emit combined light of the light from the first light source and the light from the second light source, which is diffused and reflected on a surface of the first light source, to an irradiated object.

In addition, an optical device of the present invention includes the light source device according to the present invention described above, and an optical measuring part which performs optical measurement of an irradiated object by using combined light from the light source device.

Advantageous Effects of Invention

According to the present invention, it is possible to provide the light source device capable of handling the combined light of the light from the first light source and the narrowband light from the second light source as if the combined light were single light from the first light source with a simple structure of which accuracy is not required.

In addition, according to the present invention, it is possible to provide the light source device capable of implementing an increase in the life of the filament, and emitting the combined light of the light from the electrified filament and the light in the desired wavelength band by the semiconductor light source.

Further, according to the present invention, it is possible to provide the optical device such as the optical measuring device including the above light source device.

BRIEF DESCRIPTION OF DRAWINGS

FIG. 10(a) is a view for explaining an example of light from a filament, and is a photograph showing an example of the filament in a high temperature light emitting state.

FIG. 10(b) is a view for explaining an example of light from the filament, and is a photograph showing an example of the filament at the time of non-electrification which is irradiated with LED light.

FIG. 10(c) is a view for explaining an example of light from the filament, and is a photograph showing an example of the filament in the high temperature light emitting state by electrification which is irradiated with the LED light.

FIG. 19(a) is a view showing an example of the light source device according to an embodiment of the present invention, and is a view showing an example of the filament lamp which has a flat coil filament.

FIG. 19(b) is a view showing an example of the light source device according to an embodiment of the present invention, and is a view showing an example of the filament lamp which has a double-ended flat coil.

FIG. 19(c) is a view showing an example of the light source device according to an embodiment of the present invention, and is a view showing an example of the light source device including the filament lamp shown in FIG. 19(a).

FIG. 20(a) is a view showing an example of the light source device according to an embodiment of the present invention, and is a view showing an example of the filament lamp which has a round coil filament.

FIG. 20(b) is a view showing an example of the light source device according to an embodiment of the present invention, and is a view showing an example of the filament lamp having a double-ended round coil.

FIG. 20(c) is a view showing an example of the light source device according to an embodiment of the present invention, and is a view showing an example of the light source device including the filament lamp shown in FIG. 20(a).

DESCRIPTION OF EMBODIMENTS

Figure 1:
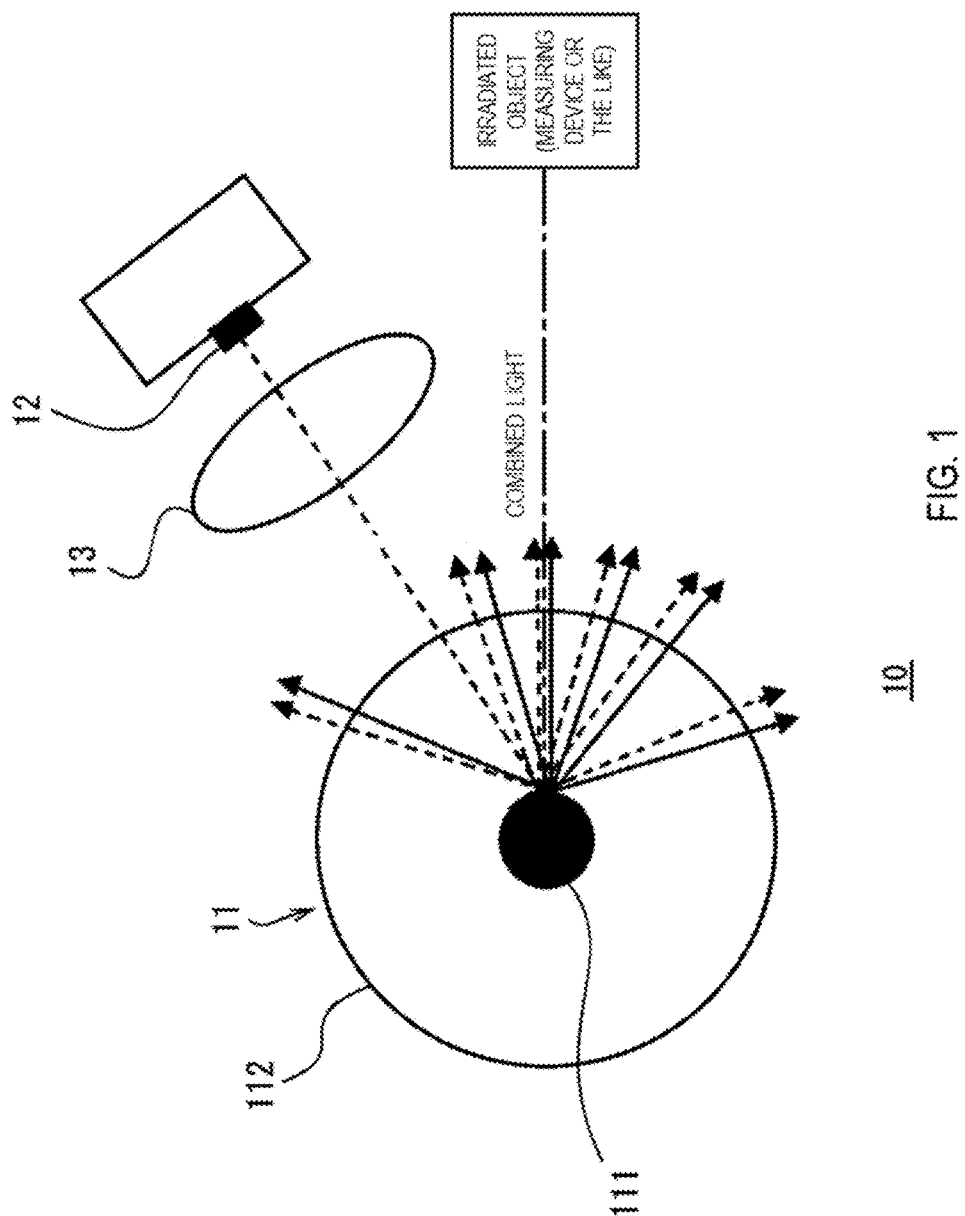
FIG. 1 is a conceptual view showing a light source device according to an embodiment of the present invention.

A light source device according to an embodiment of the present invention has a first light source, and a second light source capable of irradiating the first light source with light having a wavelength band narrower than a wavelength band of light by the first light source, wherein the first light source is configured to emit combined light of the light from the first light source and the light from the second light source which is diffused and reflected on a surface of the first light source to an irradiated object.

In addition, the optical device according to the present invention has the light source device described above, and an optical measuring part which performs optical measurement of an irradiated object by using combined light from the light source device.

Further, the first light source is arranged on an optical axis passing through the irradiated object and the optical measuring part.

In addition, a light source device according to an embodiment of the present invention has a first light source including a filament capable of heating and light emitting by electrification, and a second light source capable of irradiating the filament of the first light source with light having a wavelength in a band narrower than a band of a wavelength of light by the heating and light emitting of the first light source. The first light source of the light source device is configured to emit, from the filament, combined light of light from the filament in a state of the heating and light emitting and the light from the second light source which is diffused and reflected on a surface of the filament.

Hereinafter, embodiments of the present invention will be described with reference to the drawings. The embodiments of the present invention include contents shown in the drawings, but the embodiments thereof are not limited only to the contents. Note that, in the following description of each drawing, portions common to parts which have been already described are designated by the same reference numerals, and the duplicate description thereof will be partially omitted.

<First Light Source is Filament Lamp and Second Light Source is Semiconductor Light Source>

Figure 2:
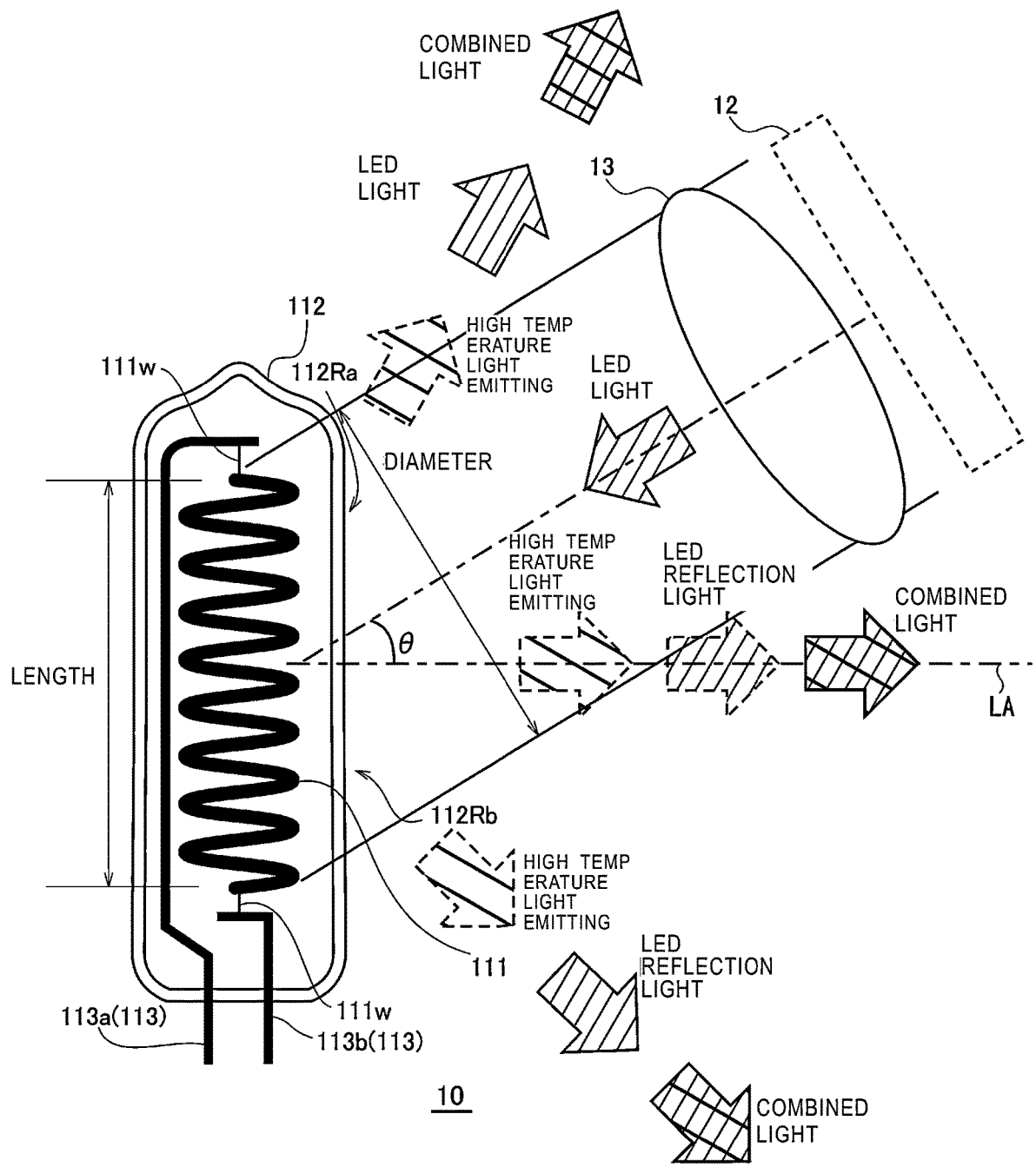
FIG. 2 is a view showing an example of the light source device according to the embodiment of the present invention.

FIG. 1 is a conceptual view showing a light source device 10 according to an embodiment of the present invention. FIG. 2 is a view showing an example of the light source device 10.

As shown in FIGS. 1 and 2, the light source device 10 according to the embodiment of the present invention has a first light source 11 and a second light source 12.

The first light source 11 is, e.g., a filament lamp including a filament 111 capable of heating and light emitting (capable of high temperature light emitting) by electrification. As the first light source 11, it is possible to use, e.g., a halogen lamp or an incandescent lamp.

The filament lamp serving as the first light source 11 has the filament 111 and a hollow bulb 112, and the filament 111 is accommodated in the bulb 112. The filament 111 is formed of tungsten or the like, and the bulb 112 is formed of a predetermined material such as light transmitting quartz glass.

In the hollow bulb 112, inert gas such as krypton gas or xenon gas is sealed, and the inert gas contains a very small amount of halogen (iodine, bromine, or the like).

In the present embodiment, a halogen lamp is used as the first light source 11.

The wavelength band of light emitted from the halogen lamp in a high temperature light emitting state by electrification is, e.g., about 300 nm to 3000 nm, and the spectrum of the light is a continuous spectrum and shifts such that a peak wavelength is reduced as the temperature of the filament is increased. Specifically, the peak wavelength is about 1160 nm when the filament temperature of the halogen lamp is 2500 K (kelvin), the peak wavelength is about 1070 nm when the filament temperature is 2700 K, and the peak wavelength is about 970 nm when the filament temperature is 3000 K.

As the second light source 12, it is possible to use a semiconductor light source such as, e.g., an LED (Light emitting diode) element, an LD (Laser Diode) element, or an organic EL (OEL: Organic electro-luminescence) element.

The second light source 12 is capable of irradiating the filament 111 of the first light source 11 with light having a wavelength in a band narrower than that of a wavelength of light by heating and light emitting of the first light source.

In the case where the LED light source is used as the second light source 12, a peak wavelength or a center wavelength has, e.g., a value in a range of 350 to 730 nm, and a half width is about 20 nm to about 100 nm. In addition, the spectrum width (full width at half maximum) of the wavelength band of light emitted from the organic EL light source serving as the second light source 12 is about 70 nm to 100 nm.

The second light source 12 is configured to irradiate the filament 111 of the light source 11 with emitted light. In an example shown in FIG. 1, the semiconductor light source serving as the second light source 12 is arranged on a board.

In the example shown in FIG. 1, a condensing optical system is provided between the filament 111 of the first light source 11 and the second light source 12. The condensing optical system is configured to condense light emitted from the second light source 12 on whole or a part of the filament 111 of the first light source 11. The condensing optical system is, e.g., a condensing lens 13 or a reflecting member (mirror).

As shown in FIGS. 1 and 2, the first light source 11 is configured to emit, at least from the filament 111, combined light of light from the filament 111 in the state of heating and light emitting (high temperature light emitting state) and light from the second light source 12 which is reflected on the surface of the filament 111.

The filament lamp such as the halogen lamp serving as the first light source 11 shown in FIG. 2 has the filament 111, the bulb 112, and leads 113 (113a, 113b).

The filament 111 is a single coil or a double coil filament. In addition, one or a plurality of the filaments 111 may be arranged in the bulb 112.

In an example shown in FIG. 2, in the hollow bulb 112 which is long in a longitudinal direction, the coil-shaped filament 111 is arranged along the longitudinal direction.

Note that an electric wire 111w pulled out from one end part of the filament 111 is electrically connected to the lead 113a formed into a crank shape, and an electric wire 111w pulled out from the other end part is electrically connected to the lead 113b.

The leads 113 electrically connected to the filament 111 are extended to the outside of the bulb 112 via a sealing member (not shown). To each lead 113, a current for turning on the lamp is supplied.

Light emitted from the semiconductor light source serving as the second light source 12 is radiated to whole or a part of the filament 111 of the first light source 11 and is reflected on the surface of the filament 111, and combined light of the reflection light and light by high temperature light emitting which is emitted from the filament 111 by electrification is emitted toward an irradiated object (a sample or a detecting device functioning as an optical measuring part) from the filament 111.

The reflection light reflected on the filament 111 includes diffuse reflection light and specular reflection light. The reflection light is specified by the shape and surface state of the filament 111, an angle of incidence of light radiated to the filament 111 from the second light source 12, and the size of an irradiation region.

In the light source device 10 according to the present invention, the shape and surface state of the filament 111, the angle of incidence of light radiated to the filament 111 from the second light source, and the size of the irradiation region are preferably optimized such that the intensity of the reflection light contributing to the combined light emitted from the filament 111 toward the irradiated object is increased.

The length of the filament 111 in the longitudinal direction is set to a predetermined length.

In addition, an angle θ formed by a line which is orthogonal to the longitudinal direction of the filament 111 and passes through substantially the center of the filament 111 (an optical axis LA which passes through the first light source 11 (filament) and the irradiated object), and a direction of incidence of light which is emitted from the second light source 12 and becomes incident on the filament 111 is specified so as to fall within an angle range of not less than 0° and not more than 90° and preferably within an angle range of not less than about 20° and not more than 70°.

That is, the light source device 10 is configured such that the light from the second light source 12 becomes incident on the filament 111 from the side of the emission of the combined light of the filament 111.

The irradiated object irradiated with the combined light may be arranged on the optical axis, or may also be arranged at a position at which the intensity of a specular reflection light component in the combined light is increased.

A direction along the line which is orthogonal to the longitudinal direction of the filament 111 and passes through substantially the center of the filament 111 may be different from the emission direction of the combined light. In addition, the optical axis LA which passes through the first light source 11 (filament) and the irradiated object does not need to be orthogonal to the longitudinal direction of the filament 111.

In addition, as described above, the first light source 11 has the bulb 112 in which the filament 111 is accommodated. The bulb 112 has a first light transmission part 112Ra (light transmission portion) which transmits light from the second light source 12 arranged outside the bulb 112 into the bulb 112, and a second light transmission part 112Rb (light transmission portion) which transmits synthetic light emitted from the filament 111 to the outside of the bulb 112.

Note that, in the bulb 112, a region other than the first light transmission part 112Ra and the second light transmission part 112Rb described above may be a light interrupting part or a light reflecting part, and may also be a light transmission part which transmits light.

In addition, the first light transmission part 112Ra and the second light transmission part 112Rb described above of the bulb 112 may be provided in separate regions of the bulb 112, may be provided in the same region, or may also be provided so as to overlap each other.

In addition, the first light source 11 may have rotation angle adjusting means capable of adjusting the rotation angle of the filament 111 with a longitudinal axis of the filament lamp used as a rotation axis. That is, in the case where one or a plurality of the filaments 111 having a desired shape such as single coil or double coil filaments are arranged in the bulb 112 of the filament lamp, by optimally adjusting the rotation angle, it is possible to perform adjustment such that light from the semiconductor light source (the second light source 12) is reflected by one or a plurality of the filaments 111, and the intensity of the combined light is thereby increased.

Further, incidence angle adjusting means capable of adjusting the angle of incidence of light from the second light source 12 on the filament 111 may be provided in the first light source 11 or the second light source 12. It is possible to easily adjust the angle of incidence.

In addition, light receiving means (a light receiving element or an imaging element) for receiving combined light or light from the first light source 11 or the second light source 12 may be provided and, based on a light reception result of the light receiving means, a light source control part may control the rotation angle adjusting means and the angle adjusting means such that the intensity of the combined light in a predetermined wavelength band is increased.

Further, in the light source device 10, a reflecting member which reflects the above-described diffuse reflection light by the filament 111 toward the irradiated object may be arranged around the filament 111. That is, as the shape of the reflecting member, it is possible to adopt any shape such as a flat shape or a paraboloid shape.

Figure 3:
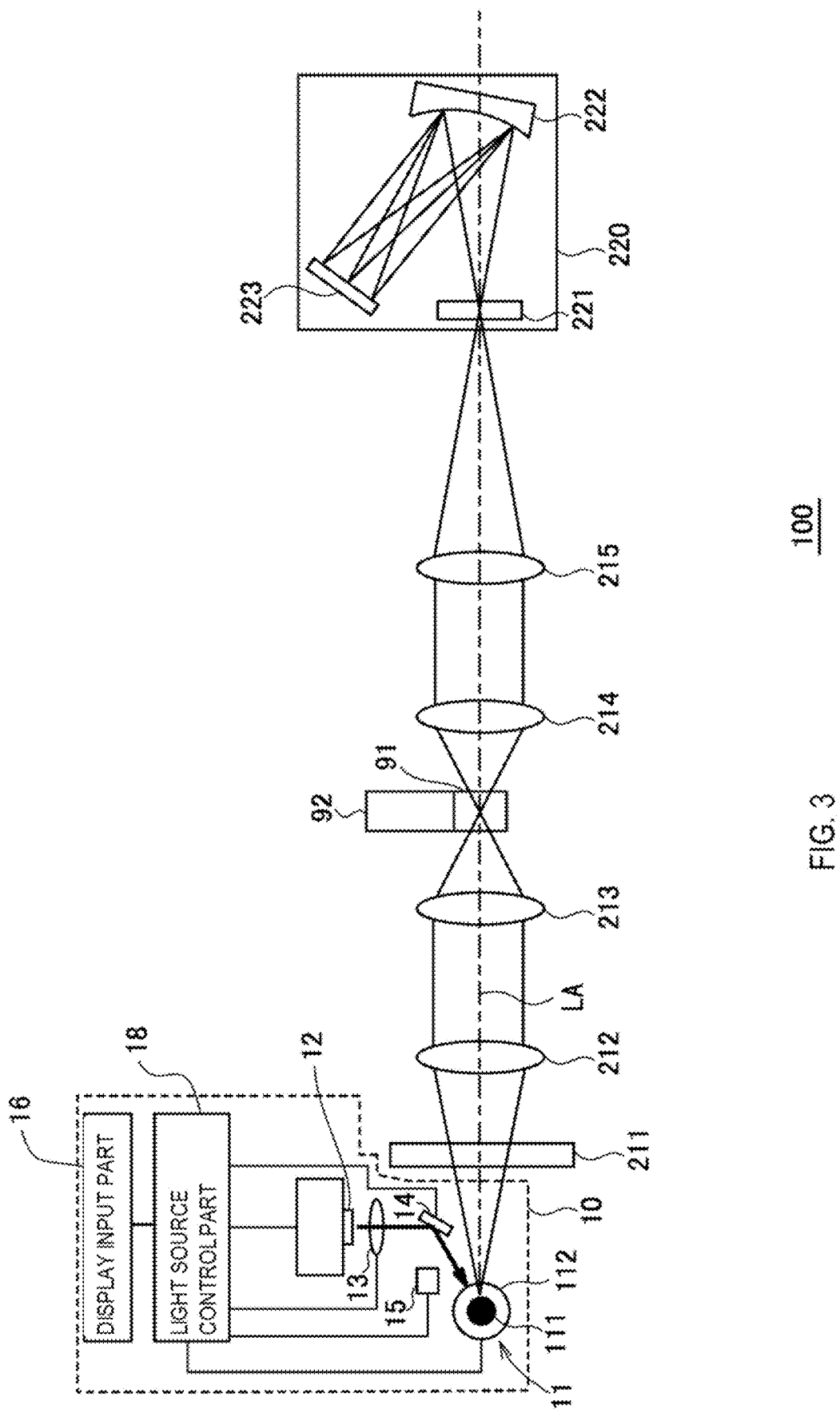
FIG. 3 is a view showing an example of an optical device (optical measuring device) including the light source device according to the embodiment of the present invention.

FIG. 3 is a view showing an example of an optical device 100 (optical measuring device) including the light source device 10 according to the embodiment of the present invention.

The optical device 100 has the light source device 10, a filter 211, a lens 212, a lens 213, a lens 214, a lens 215, and a detecting device 220 serving as an optical measuring part.

In the optical device 100, after the sample 91 serving as the irradiated object accommodated in a container 92 is irradiated with light (combined light) emitted from the light source device 10 via the filter 211, the lens 212, and the lens 213, light transmitted through the sample 91 enters the detecting device 220 serving as the optical measuring part via the lens 214 and the lens 215 which serve as light guiding optical systems.

In the detecting device 220, light having passed through a pinhole 221 is dispersed by a grating 222 (diffraction grating) which disperses light into lights having individual wavelengths, the lights having the individual wavelengths obtained by dispersion by the grating 222 are received by a light receiving device 223 (a light receiving element or the like), and predetermined optical measurement processing related to the sample is performed by a computer (not shown) serving as an analyzing device based on a signal indicative of a light reception result of the light receiving device 223.

Note that the optical device 100 is not limited to the above embodiment, and any device which uses the combined light from the light source device 10 according to the present invention may be used.

Specifically, the light source device 10 shown in FIG. 3 has the first light source 11, the second light source 12, the condensing lens 13 and the reflecting part 14 (mirror) which serve as the optical condensing systems, a light receiving part 15, a display input part 16, and a light source control part 18.

The light source control part 18 is a computer including a CPU and a storage part, and collectively controls individual components of the light source device 10. In addition, the light source control part 18 may have a power supply circuit which supplies power to the first light source 11, and a power supply circuit which supplies power to the second light source 12.

The light receiving part 15 is, e.g., a light receiving element or an imaging element, and receives light from the filament 111 of the first light source 11 or the second light source 12 for light source adjustment and outputs a signal indicative of a light reception result to the light source control part 18.

The display input part 16 is, e.g., a switch, a button, a touch panel, or a display device, and has functions as an input part and a display part. Note that, with regard to the display input part 16, the input part and the display part may be provided separately.

The light source control part 18 controls the first light source 11 and the second light source 12. This light source control part 18 performs processing of switching, in response to a signal from the input part, between a first mode for performing control in which a current having a first current value is applied to the filament 111 of the first light source 11 (filament high temperature light emitting state) and the second light source 12 is brought into a non-driving state, and a second mode for performing control in which a current having a second current value which is less than the first current value is applied to the filament 111 of the first light source 11 (filament low temperature light emitting state) and the filament 111 is irradiated with light emitted from the second light source 12.

That is, only light by high temperature light emitting is emitted from the filament 111 in the high temperature light emitting state of the first light source 11 in the first mode, combined light of light by high temperature light emitting of the filament 111 of the first light source 11 and light from the second light source 12 is emitted from the filament 111 in the second mode, and it is possible to provide the light source device 10 capable of easily switching between the first mode and the second mode.

Figure 4:
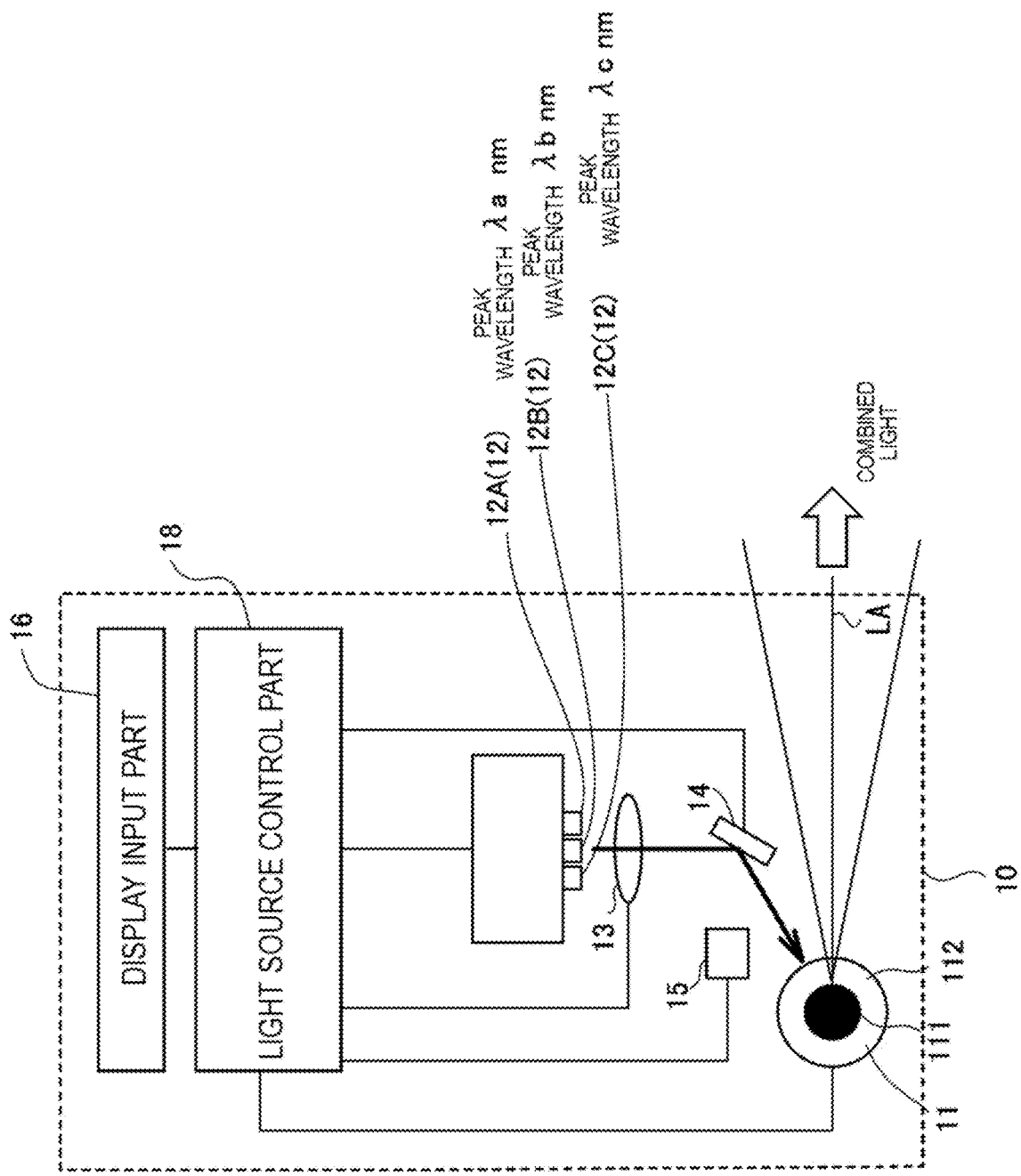
FIG. 4 is a view showing an example of the light source device including a plurality of semiconductor light sources which have different peak wavelengths or different center wavelengths of light.

FIG. 4 is a view showing an example of the light source device 10 including a plurality of semiconductor light sources having different peak wavelengths or different center wavelengths of light.

The second light source 12 shown in FIG. 4 includes a plurality of the semiconductor light sources capable of emitting lights having different peak wavelengths or different center wavelengths. Specifically, for example, a semiconductor light source 12A emits light including a wavelength band in which the peak wavelength or the center wavelength is λa [nm], a semiconductor light source 12B emits light including a wavelength band in which the peak wavelength or the center wavelength is λb [nm], and a semiconductor light source 12C emits light including a wavelength band in which the peak wavelength or the center wavelength is λc [nm].

Note that, while FIG. 4 shows an example of three semiconductor light sources, the second light source 12 may include two or more semiconductor light sources.

The light source control part 18 performs control such that, among a plurality of the semiconductor light sources, any one or two or more semiconductor light sources are driven and the filament 111 of the first light source 11 is irradiated with lights having different peak wavelengths.

Figure 5:
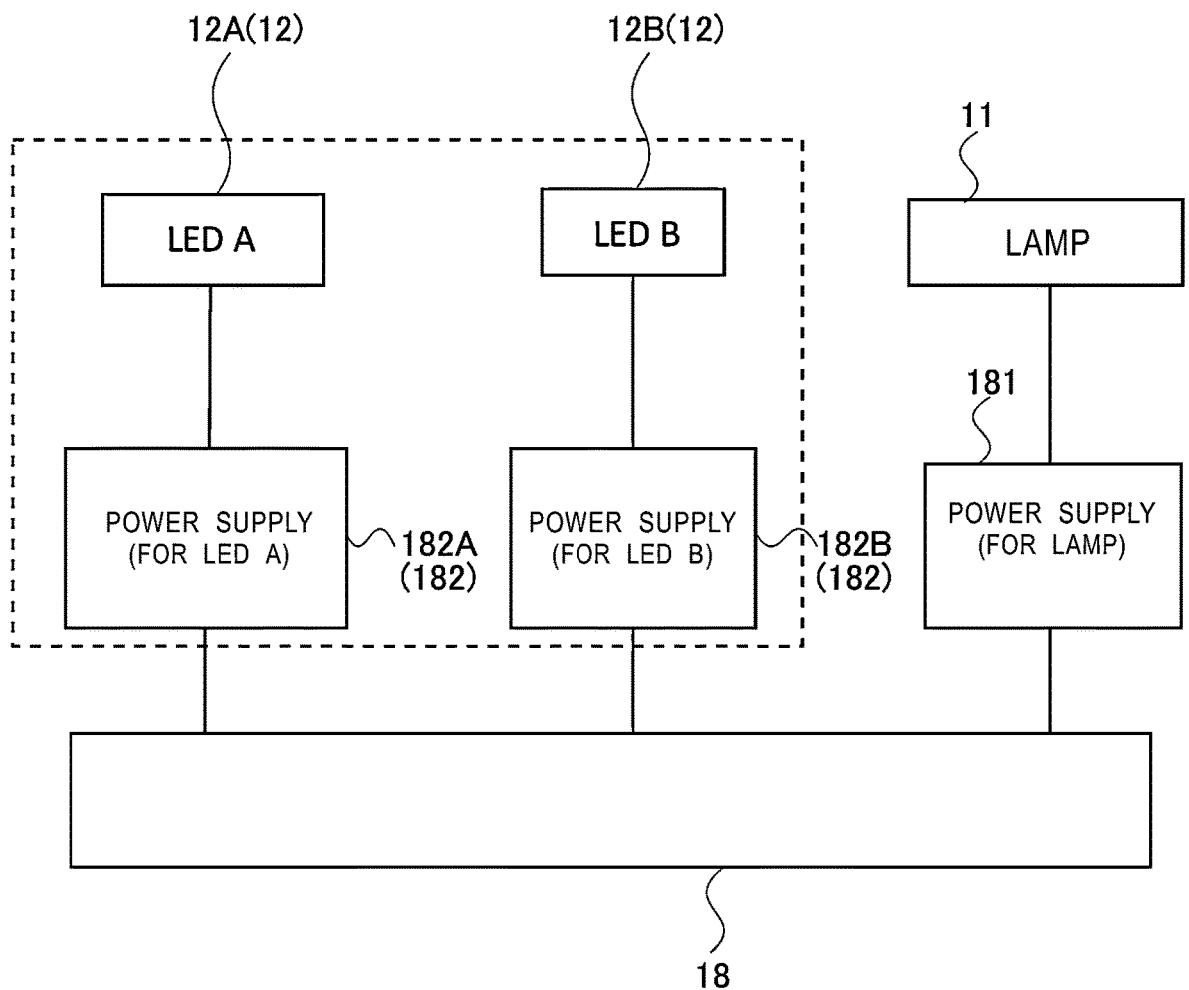
FIG. 5 is a view showing examples of an LED power supply and a halogen lamp power supply controlled by a light source control part of the light source device according to the embodiment of the present invention.

FIG. 5 is a view showing examples of an LED power supply 182 (second light source power supply) and a halogen lamp power supply 181 (first light source power supply) which are controlled by the light source control part 18 of the light source device according to the embodiment of the present invention.

For example, high stability (temporal stability or the like) is required of the light source device for biochemical analysis.

In the halogen lamp serving as the first light source 11, a resistance value when the halogen lamp is turned on is stabilized, and hence the halogen lamp can emit light having extremely stable intensity in voltage control and current control. This is because a difference between the filament temperature when the halogen lamp is turned on and the ambient temperature of the installed lamp is extremely large and, even when the temperature environment of the device or the like changes to a certain degree, an influence on the filament temperature is extremely small and change of electric characteristics is also small.

The LED element serving as the second light source 12 is basically a voltage element and the light emission intensity of the LED element is proportional to a current value, and hence the LED element is subjected to current control. Light emission efficiency is significantly dependent on the temperature of the LED element, and hence it is preferable to perform delicate temperature control or feedback control by sensing light output in order to stabilize the light emission efficiency.

That is, the light source device according to the present invention preferably has means for reducing fluctuation over time of the light emission intensity of the LED element serving as the second light source 12 (reduction tool of fluctuation over time).

The reduction tool of fluctuation over time may perform drive current control of the LED element and, specifically, as the drive current control, for example, light from the LED element may be detected by a light receiving device (not shown) and feedback control may be performed on the drive current of the LED element such that a detection value of the light receiving device becomes a set value (a specific value or a range).

In addition, control means of fluctuation over time may perform element temperature control and, specifically, as the element temperature control, element temperature is controlled such that the temperature of the LED element serving as the second light source becomes a set value (a specific value or a range) by using a thermoelectric element such as, e.g., a Peltier element.

Further, the control means of fluctuation over time may further reduce the fluctuation over time of the light emission intensity of the LED element serving as the above-described second light source 12 by combining the drive current control and the element temperature control.

Note that, in the optical measuring device, according to predetermined specifications, reaction time is set to 10 minutes, and a difference between absorbance when a reagent is charged and absorbance after a lapse of 10 minutes is measured. Accordingly, the fluctuation of the light emission intensity in the 10 minutes is observed as the fluctuation of the measurement value of the absorbance. The fluctuation of required absorbance of $10^{-4}$ or less corresponds to the light intensity fluctuation of $2.3 \times 10^{-4}$ in the vicinity of a transmittance of 100%.

Figure 6:
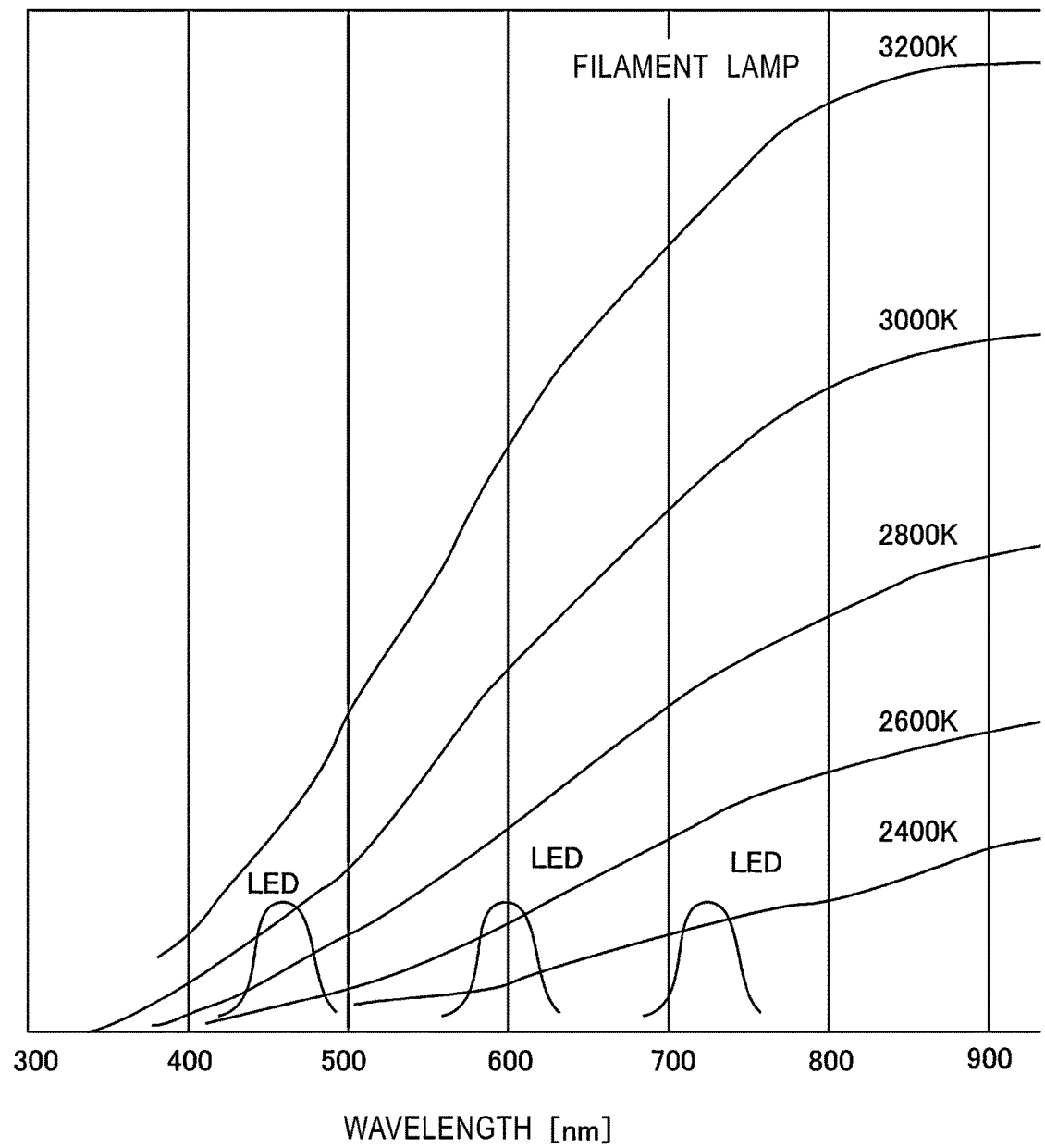
FIG. 6 is a view showing an example of temperature change of a spectral distribution of light emitted from a filament lamp (first light source) and an example of a spectral distribution of light emitted from a semiconductor light source (second light source).

FIG. 6 is a view showing an example of temperature change of the spectral distribution of light emitted from the filament lamp (first light source 11) in the state of heating and light emitting by electrification, and an example of the spectral distribution of light emitted from the semiconductor light source (second light source 12).

The wavelength band of light emitted from the halogen lamp in the state of heating and light emitting by electrification is, e.g., about 300 nm to 3000 nm, and FIG. 6 shows the wavelength region of about 300 nm to about 900 nm. The spectral distribution shifts such that the peak wavelength of light emitted from the halogen lamp is reduced as the temperature of the filament is increased.

For example, in an example shown in FIG. 6, it is assumed that the wavelength bands required for measurement by the detecting device 220 serving as the optical measuring part are in the vicinities of 900 nm, 730 nm, 600 nm, and 480 nm.

In the case where the temperature of the filament 111 of the first light source 11 is set to a low temperature in order to increase the life of the filament 111, e.g., in the case where the temperature of the filament is reduced from 3200 K to 2600 K, the intensity of the wavelength band required for measurement is reduced, and there is a possibility that adequate optical measurement cannot be performed.

In the light source device 10 of the present invention, the filament 111 is irradiated with light having a peak wavelength of 900 nm, 730 nm, 600 nm, or 480 nm which is emitted from the second light source 12 such that the intensity of each wavelength region described above of combined light emitted from the filament 111 becomes the intensity required for the measurement, and the combined light having the intensity of the desired wavelength region is thereby emitted from the filament 111 in the state of heating and light emitting by electrification.

Figure 7:
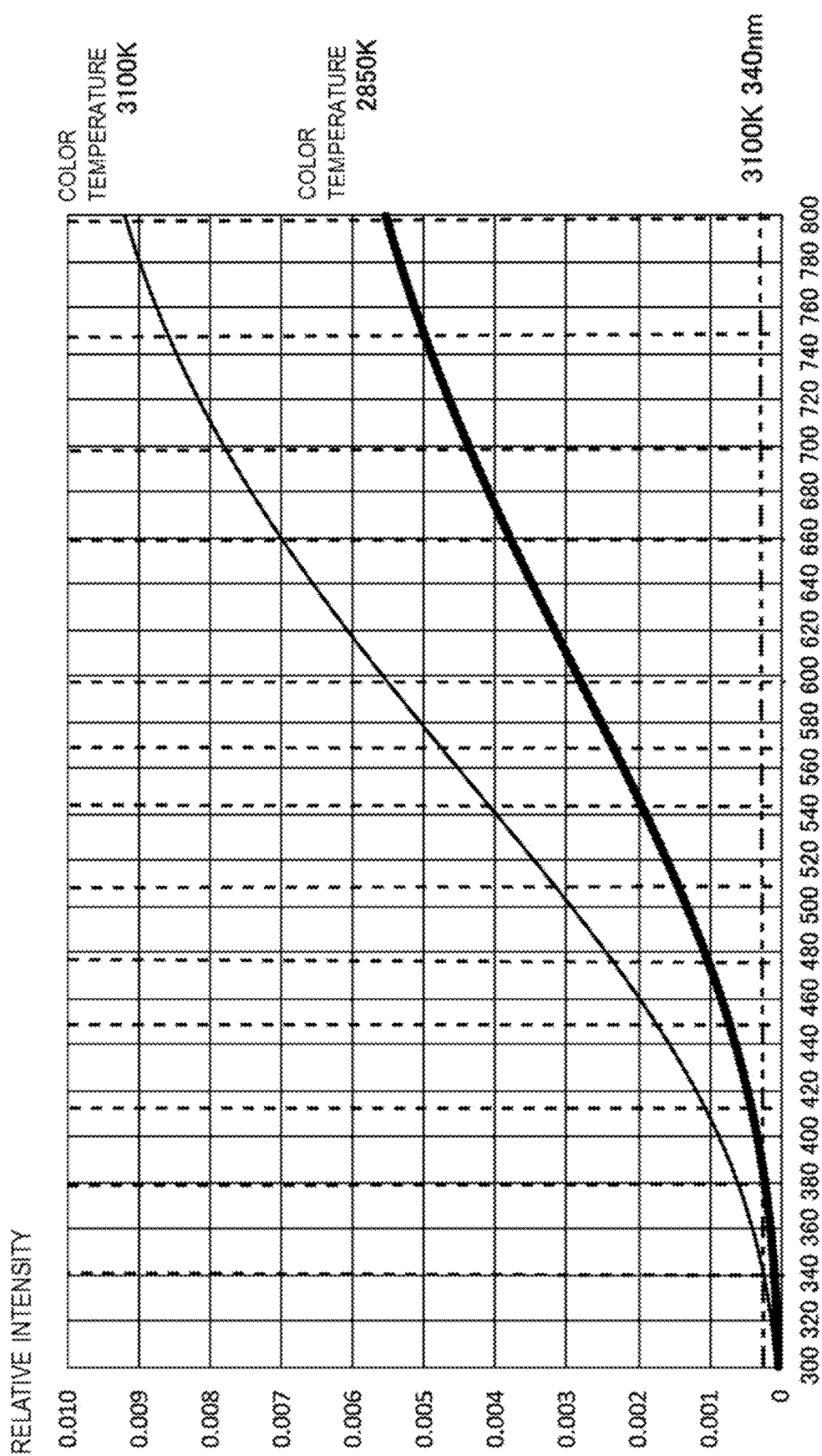
FIG. 7 is a view showing an example of a spectrum at a color temperature of 3100 K of a halogen lamp and an example of a spectrum at a color temperature of 2850 K of the halogen lamp.
Figure 8:
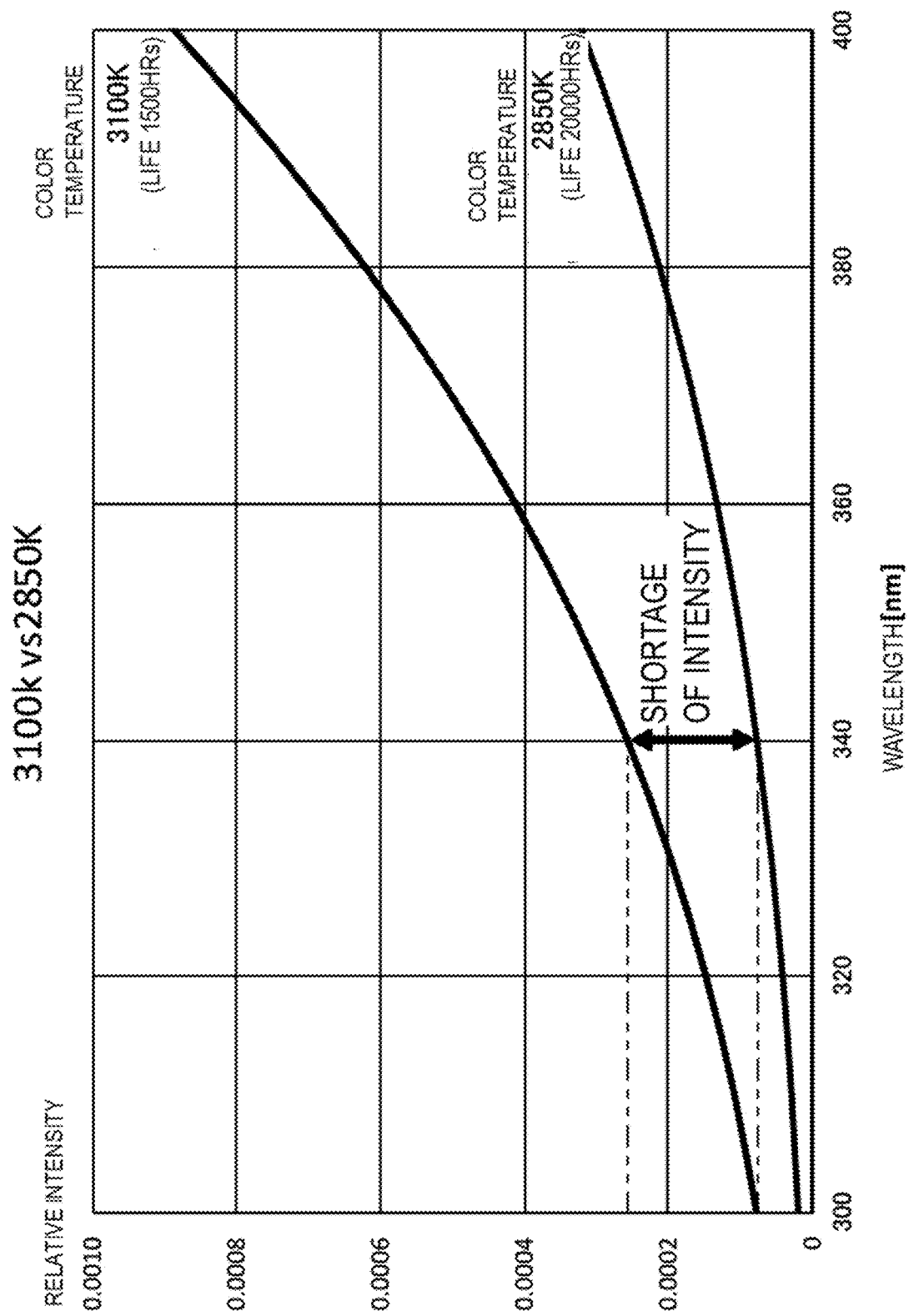
FIG. 8 is a view showing an example of a light amount target when LED light and lamp light are superimposed on each other.

FIG. 7 is a view showing an example of a spectrum at a color temperature of 3100 K of the halogen lamp and an example of a spectrum at a color temperature of 2850 K thereof. FIG. 8 is a view showing an example of a light amount target when LED light and lamp light are superimposed on each other. The light amount target in FIG. 8 indicates a spectrum region which is insufficient for the halogen lamp used in optical measurement, and a target value to which light intensity is to be increased.

In addition, the detecting device 220 serving as the optical measuring part such as a biochemical automatic analyzing device measures intensities of lights having a plurality of wavelengths ranging from ultraviolet light to ultrared light and performs optical measurement such as biochemical analysis, and hence a predetermined light intensity is required at each wavelength. For example, as a specific example, in the case of Clinical Chemistry Analyzer CA-800 (manufactured by FURUNO ELECTRIC CO., LTD.), measurement is performed for 13 wavelengths including wavelengths of 340, 380, 415, 450, 478, 510, 546, 570, 600, 660, 700, 750, and 800 nm (see, e.g., the home page of FURUNO ELECTRIC CO., LTD. https://www.furuno.com/jp/products/ClinicalChemistryAnalyzer/CA-800). In the case of Hitachi Automatic Analyzer 3500 (manufactured by Hitachi Hi-Tech Corporation.), measurement is performed for 12 wavelengths including wavelengths of 340, 405, 450, 480, 505, 546, 570, 600, 660, 700, 750, and 800 nm (see, e.g., the home page of JACLaS Japanese Association of Clinical Laboratory Systems https://jaclas.or.jp/Product/index?id=92126). Note that the detecting device 220 is not limited to the above specific examples.

For example, in the case where the color temperature of 3100 K of the halogen lamp is reduced to the color temperature of 2850 K, as shown in FIGS. 7 and 8, the light intensity at each wavelength mentioned above is reduced.

In the present invention, for example, as shown in FIG. 8, it is possible to compensate a shortage of the light intensity at the wavelength of 340 nm by the halogen lamp serving as the first light source (compare the color temperature of 2850 K with the color temperature of 3100 K) with the LED light of the second light source. In addition, the light intensities at other wavelengths may be strengthened by the LED light from the second light source in accordance with a required value.

Note that the life of the halogen lamp serving as the first light source is about 1500 hours in the case where the halogen lamp is continuously operated at the color temperature of 3100 K, and the life thereof is about 20000 hours in the case where the color temperature is reduced to the color temperature of 2850 K and the halogen lamp is continuously operated.

That is, the light source device according to the present invention can implement, with a simple configuration, an increase in the life of the first light source, and compensate the shortage of the light intensity at the wavelength used in light measurement with light from the second light source when the first light source is driven at a relatively low color temperature.

Note that the light source device 10 is not limited to the above-described embodiment, and the light source device 10 may also be configured to emit light having one or a plurality of peak wavelengths from the semiconductor light source serving as the second light source 12 so as to compensate light in a wavelength band required for the measurement.

Figure 9:
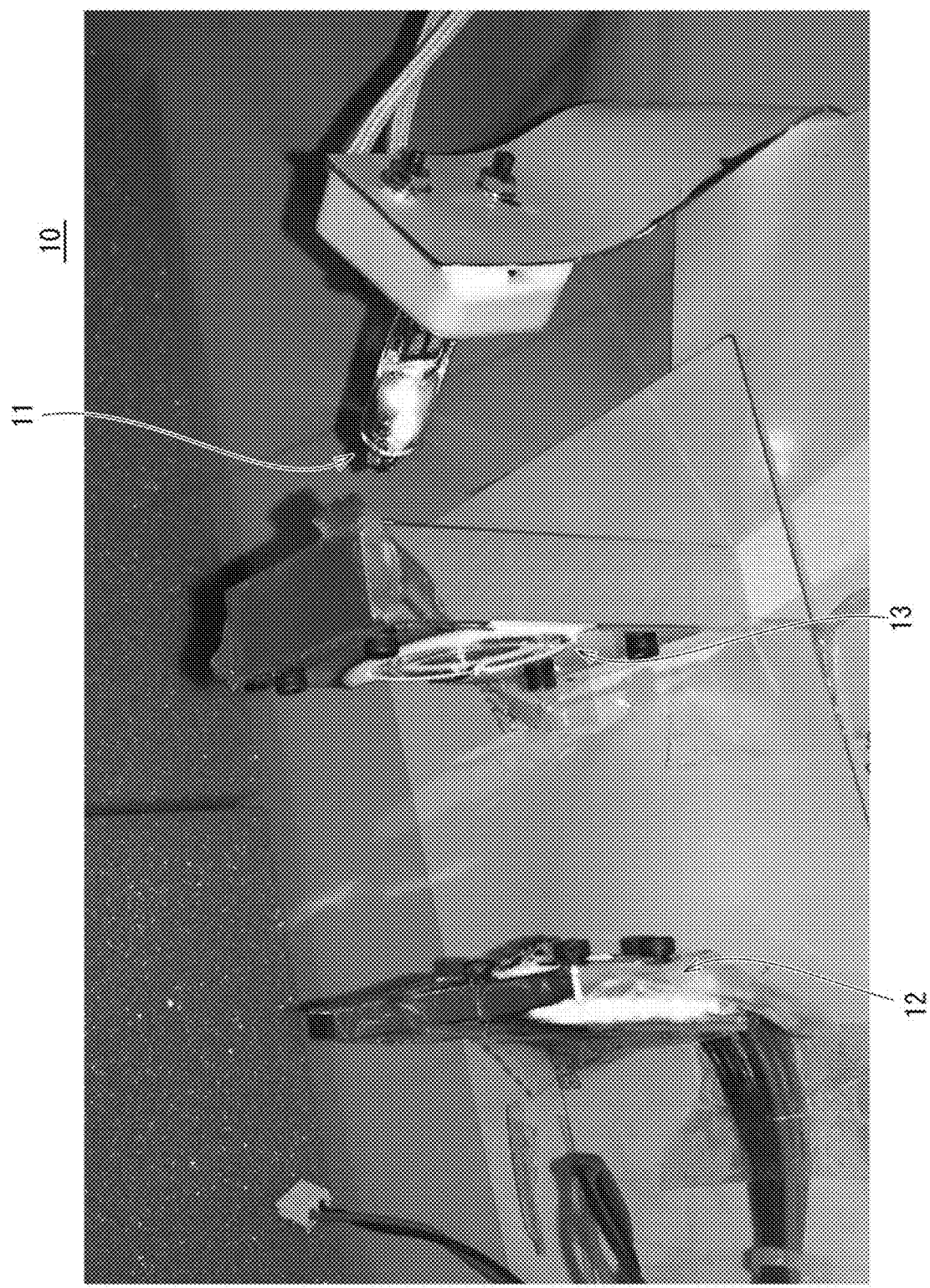
FIG. 9 is a view showing a specific example of the light source device according to the embodiment of the present invention.

FIG. 9 is a view showing a specific example of the light source device according to the embodiment of the present invention.

The inventors of the present application actually fabricated the light source device in order to determine effects by the light source device according to the present invention, as shown in FIG. 9.

In the example shown in FIG. 9, as the second light source 12, a plurality of LED elements capable of emitting light having a peak wavelength of 460 nm were arranged on a board at substantially regular intervals in a matrix such that an outer shape was formed into a substantially circular shape.

The condensing lens 13 is arranged between the filament lamp serving as the first light source 11 and the LED light source (LED elements) serving as the second light source 12, and the filament of the filament lamp serving as the first light source 11 in the high temperature light emitting state is irradiated with light emitted from the LED light source with the condensing lens 13. Then, combined light of light emitted from the filament in the high temperature light emitting state and reflection light of light from the LED light source was imaged with an imaging device (not shown). In addition, the combined light was dispersed by a spectral device (not shown), and the intensity at each wavelength (relative intensity) was measured.

Note that, for comparison, only a filament lamp (halogen lamp) in the high temperature light emitting state which served as a light source device of a first comparative example was prepared (in a state in which irradiation with the LED light was not performed), and light emitted from the halogen lamp was imaged similarly with an imaging device (not shown). In addition, the light emitted from the halogen lamp was dispersed by a spectral device (not shown), and the intensity at each wavelength (relative intensity) was measured.

Further, the filament of the halogen lamp in a non-electrification state was irradiated with light from the LED light source serving as the second light source 12, and reflection light was imaged similarly with an imaging device (not shown).

<Emission Image of Light from Filament>

<First Comparative Example

As shown in FIG. 10(a), in the case where the electrified filament is brought into the high temperature light emitting state, light corresponding to the temperature of the filament is emitted from the filament. Note that, in an example shown in FIG. 10(a), the filament is not irradiated with light from the semiconductor light source.

Second Comparative Example

As shown in FIG. 10(b), in the case where the filament which is not electrified is irradiated with light from the LED light source, the light is reflected on the surface of the filament, and is emitted from the filament. Note that it is preferable to perform setting such that whole or a part of the filament is irradiated with light from the LED light source.

<Light Source According to Present Invention>

FIG. 10(c) is a photograph showing an example of combined light of light which is emitted from the semiconductor light source (LED light source) and radiated to the filament in the high temperature light emitting state by electrification, and is reflected on the filament, and light by high temperature light emitting of the filament. It was possible to determine that the combined light was emitted from the coil-shaped filament.

Figure 11:
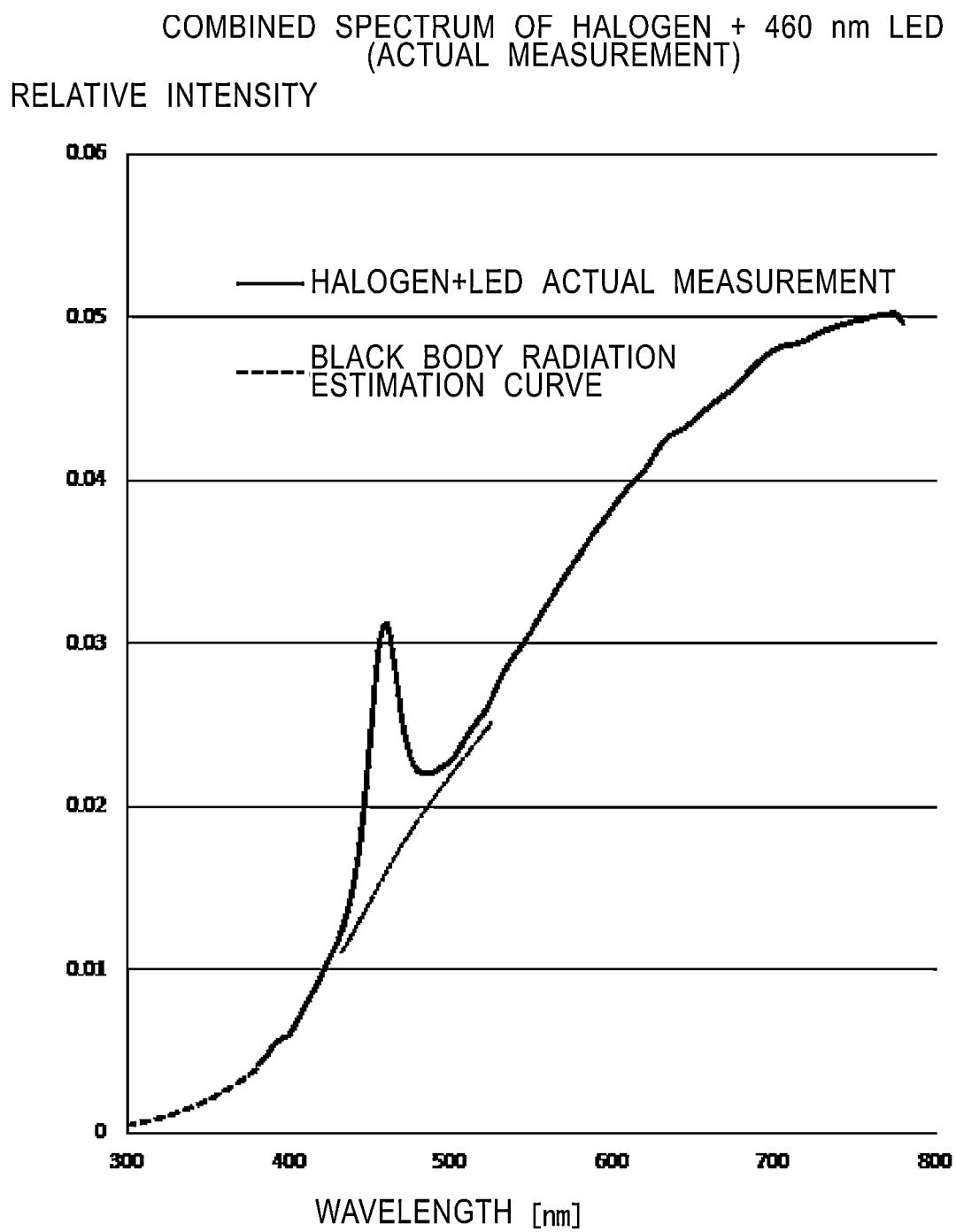
FIG. 11 is a view showing an example of the spectrum of combined light by the halogen lamp and an LED light source shown in FIG. 10(c).
Figure 12:
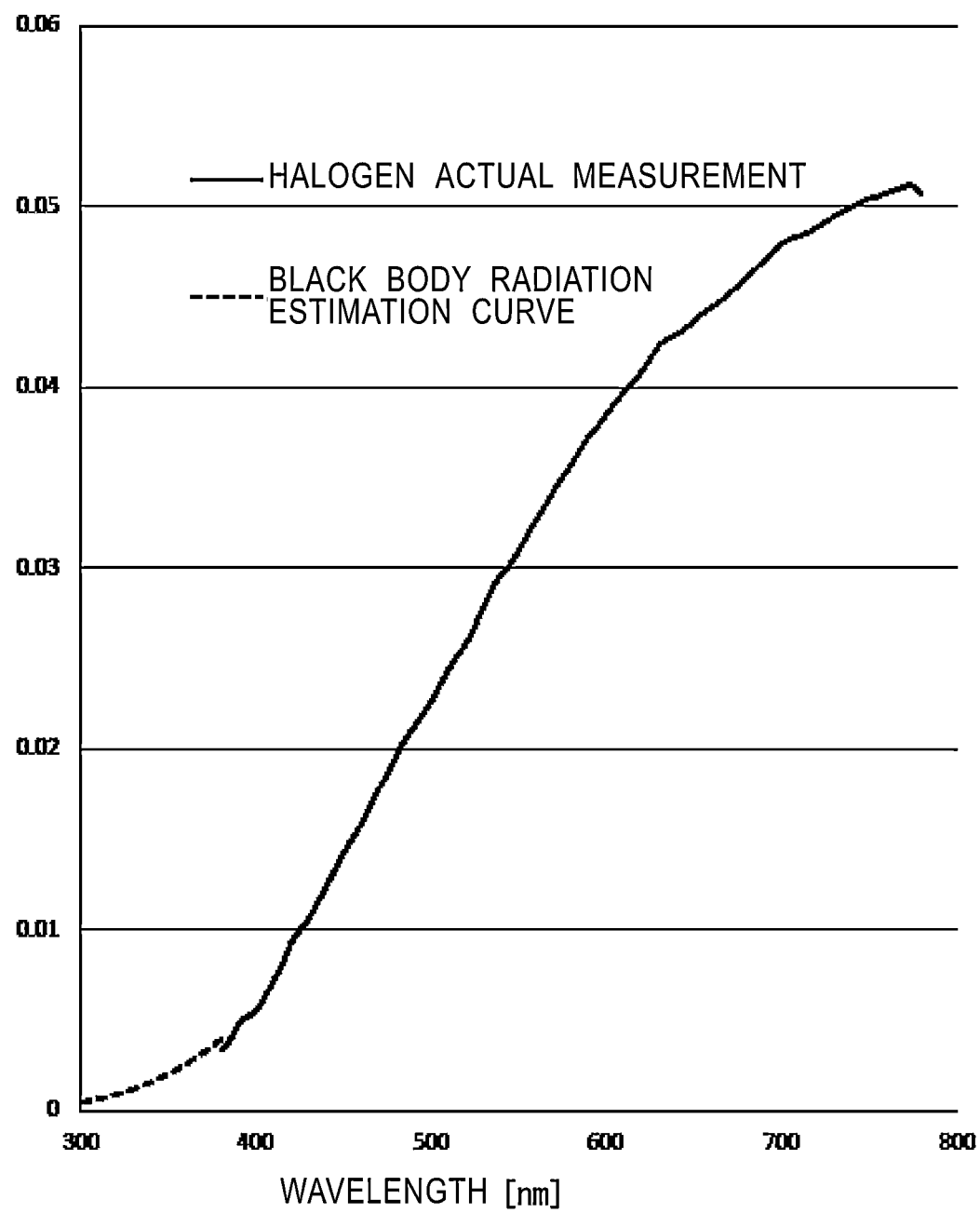
FIG. 12 is a view showing an example of the spectrum of light only from the halogen lamp of a first comparative example shown in FIG. 10(a).

FIG. 11 is a view showing an example of the spectrum of combined light of light by the halogen lamp in the state of heating and light emitting by electrification which serves as the light source device according to the present invention shown in FIG. 10(c) and light from the LED light source. FIG. 12 is a view showing an example of the spectrum of light from the halogen lamp of the first comparative example shown in FIG. 10(a).

A solid line in a wavelength region of 380 nm to 780 nm in FIG. 12 indicates the spectrum of light from the halogen lamp, and a broken line in a wavelength region of 300 nm to 380 nm in FIG. 12 indicates an estimation curve calculated from a black body radiation model.

As shown in FIG. 11, it was determined that, in the light source device according to the present invention, the intensity (light amount) in a narrow wavelength band having a peak wavelength of 460 nm from the LED light source serving as the semiconductor light source was added to light by the halogen lamp in the state of heating and light emitting by electrification, and the intensity of the light by the halogen lamp was increased.

That is, according to the light source device of the present invention, it is possible to obtain the combined light in the wavelength band required for optical measurement with a simple configuration.

Figure 13:
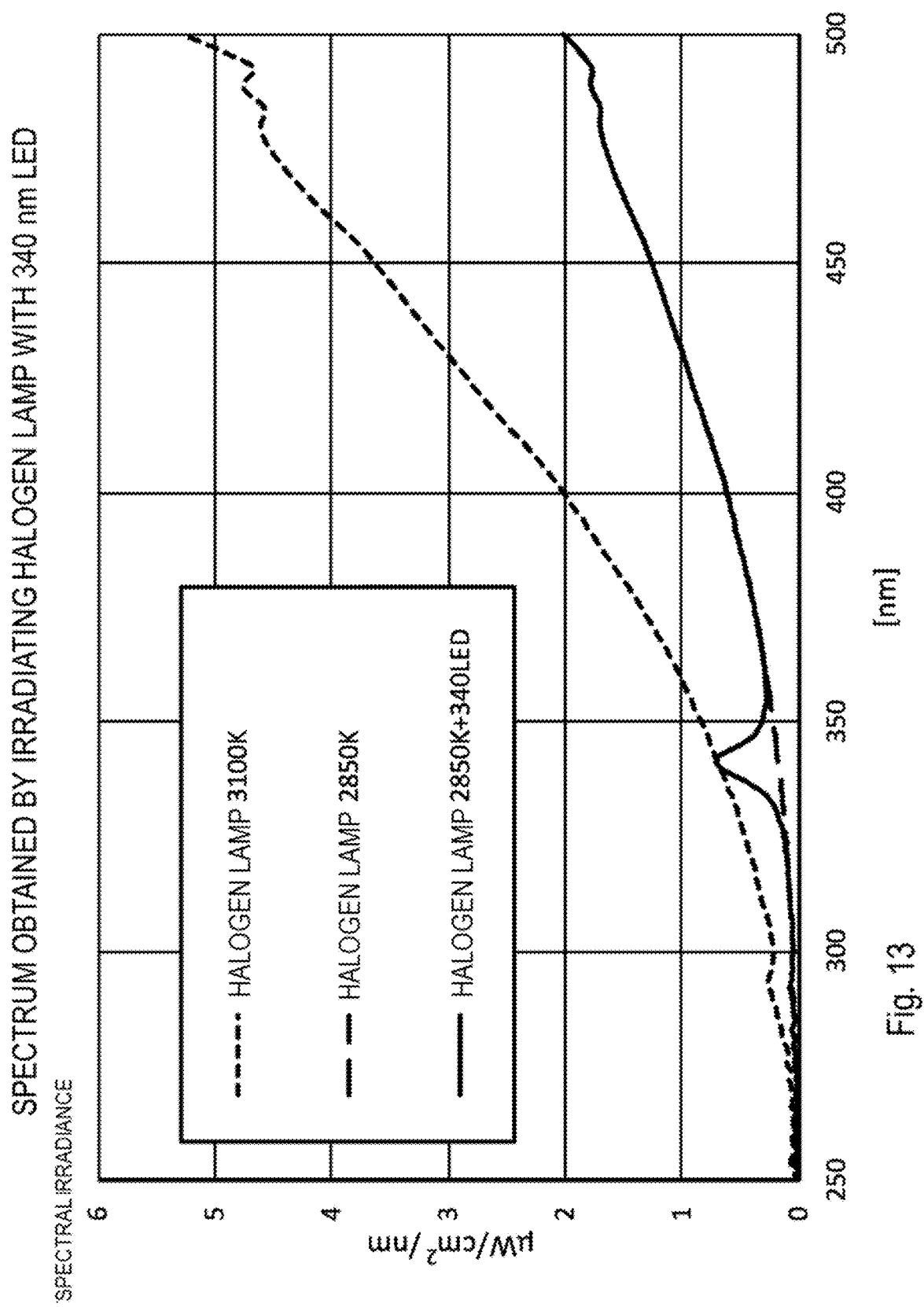
FIG. 13 is a view showing an example of the spectrum of combined light when the halogen lamp serving as the first light source is irradiated with LED light having a wavelength of 340 nm.

The inventors of the present application actually measured the spectrum of light at a color temperature of 3100 K of the halogen lamp serving as the first light source, the spectrum of light at a color temperature of 2850 K thereof, and the spectrum of combined light when the filament of the halogen lamp having the color temperature of the halogen lamp of 2850 K was irradiated with light having a wavelength of 340 nm from the LED light source serving as the second light source, and were able to obtain a measurement result shown in FIG. 13.

As shown in FIG. 13, it was determined that, in the light source device according to the present invention, even in the case where the color temperature of the halogen lamp was set to a relatively low color temperature (the color temperature of 2850 K), by irradiating the first light source with the LED light (the wavelength of 340 nm) from the LED light source serving as the second light source, it was possible to make the light intensity of the combined light at the wavelength of 340 nm to be about the same level as that of the light intensity of the halogen lamp alone (the color temperature of 3100 K). Note that it is possible to easily control the light intensity of the combined light at the above wavelength by appropriately adjusting the intensity of light emitted from the LED light source serving as the second light source with the light source control part.

Figure 14:
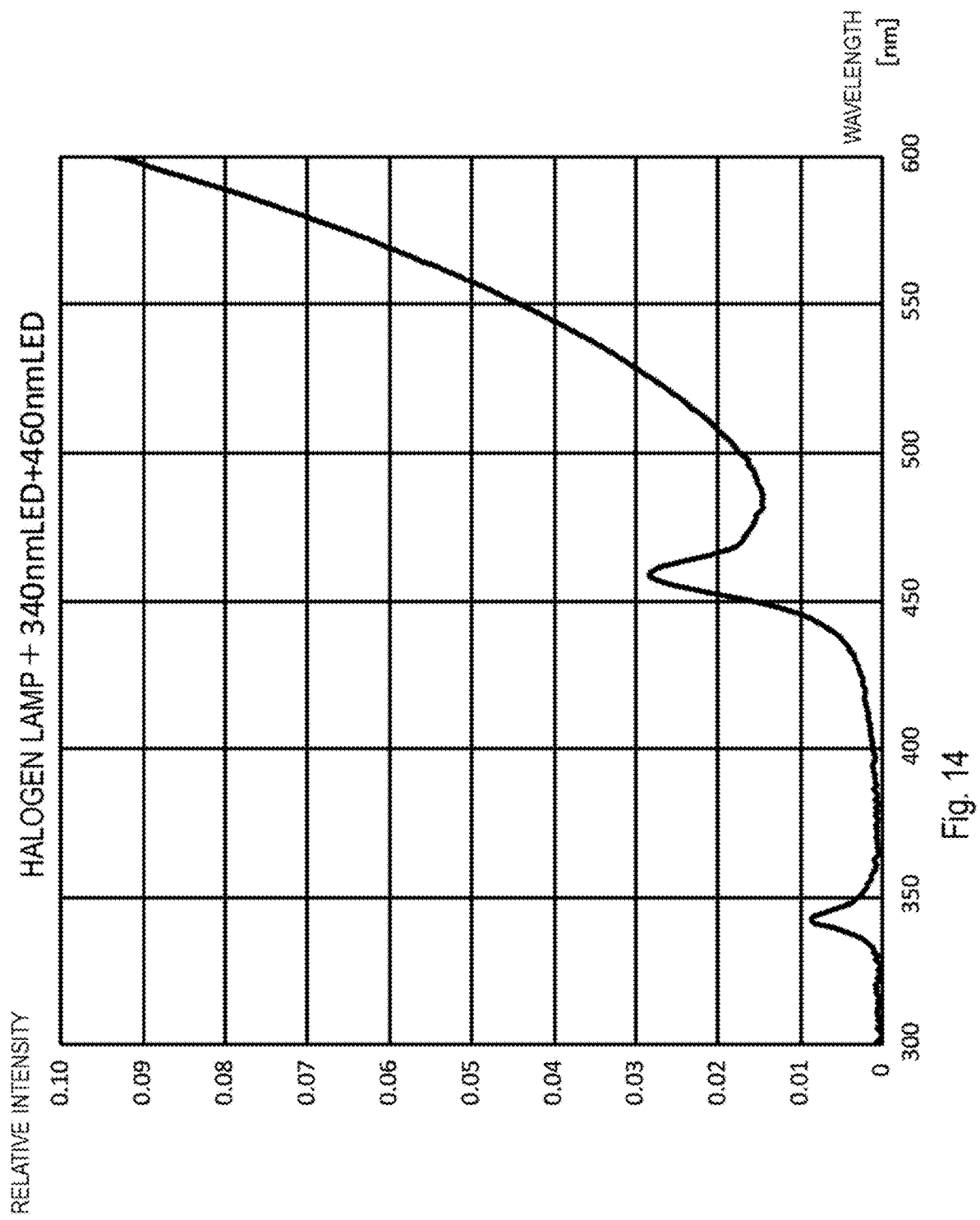
FIG. 14 is a view showing an example of a measurement result of combined light from the light source device which has the halogen lamp, an LED with a wavelength of 340 nm, and an LED with a wavelength of 460 nm.

In addition, the inventors of the present application actually measured the spectrum of combined light from the light source device having the halogen lamp serving as the first light source, the LED which emitted light having a wavelength of 340 nm as the second light source, and the LED which emitted light having a wavelength of 460 nm, and were able to obtain a measurement result shown in FIG. 14.

That is, it was determined that, in the light source device according to the present invention, in the case where the filament of the halogen lamp serving as the first light source was irradiated with each of lights from the LED light sources having different wavelengths of light, the combined light from the surface of the filament of the first light source easily increased the light intensity at each wavelength mentioned above, as shown in FIG. 14.

Figure 15:
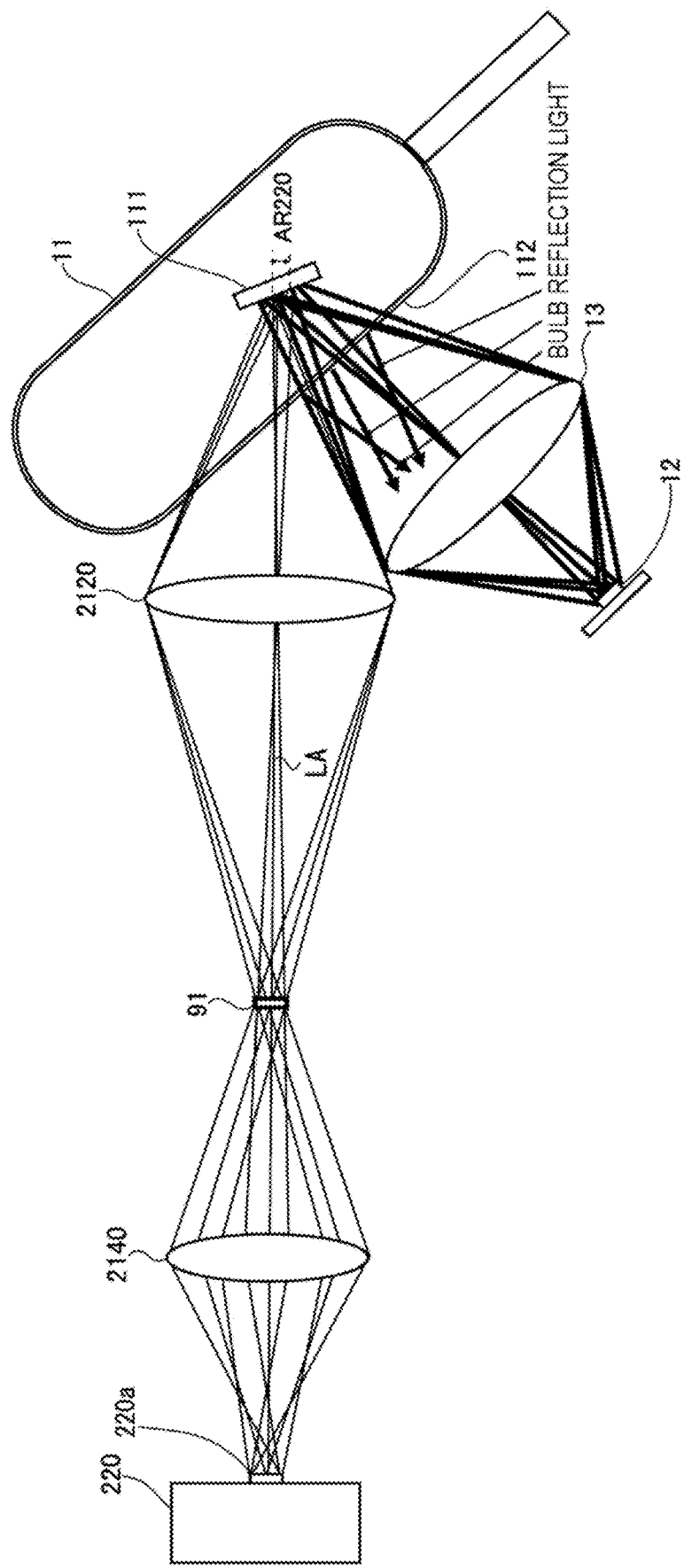
FIG. 15 is an arrangement diagram showing an example of the optical device having the light source device according to the embodiment of the present invention in which surface reflection on a bulb of the filament lamp does not cause stray light.

FIG. 15 is an arrangement diagram (top view) showing an example of the optical device 100 having the light source device 10 according to the embodiment of the present invention in which surface reflection on the bulb 112 of the filament lamp serving as the first light source 11 does not cause stray light.

The optical device 100 shown in FIG. 15 is configured such that the filament 111 of the first light source 11 is irradiated with light emitted from the semiconductor light source serving as the second light source 12, the sample 91 serving as the irradiated object is irradiated with combined light of light diffused and reflected on the filament 111 and light by heating and light emitting of the filament 111 via a measuring optical system 2120 (a lens or the like), and light having passed through the sample 91 enters a narrow hole (aperture 220a) of the detecting device 220 via a measuring optical system 2140 (a lens or the like).

Figure 16:
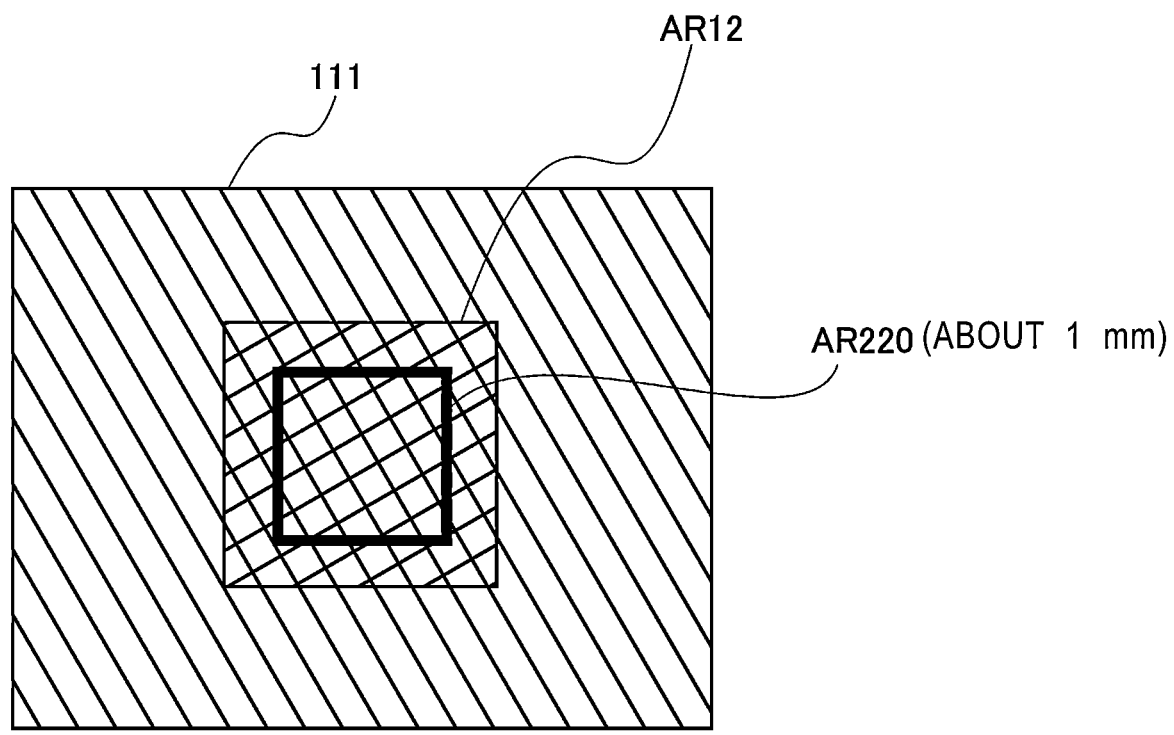
FIG. 16 is a view showing an example of an irradiation range of LED light and an example of a utilization range which is utilized in optical measurement by an optical measuring part (detecting device) in the filament of the filament lamp of the optical device shown in FIG. 15.

FIG. 16 is a partially enlarged view of the filament 111 and, as shown in FIG. 16, an irradiation range AR12 (region) by LED light from the second light source in the filament 111 of the filament lamp is set to be larger than an effective utilization range AR220 (region) utilized in optical measurement by the optical measuring part (detecting device 220). With this, accuracy is not required of optical adjustment of LED light irradiation to the filament 111, and the optical adjustment thereof can be performed easily.

In addition, in the detecting device 220, light from the effective utilization range AR220 of the filament 111 passes through the sample 91 and is used in optical measurement, but a region outside the effective utilization range AR220 scarcely contributes to the optical measurement. Therefore, an excessively large irradiation range AR12 is useless for the optical measurement, and hence the second light source 12 is configured to irradiate the same range as or slightly wider than the effective utilization range AR220 (irradiation range AR12) on the surface of the filament 111 with light. For example, in consideration of a reduction in light amount by an increase in irradiation range and a minute displacement or error of the second light source 12, it is preferable to irradiate the irradiation range AR12 of which vertical and horizontal sides are 1.4 times or less as long as those of the effective utilization range AR220 with light. Specifically, the effective utilization range AR220 which is a 1-mm square is irradiated by using a 1.4-mm square (irradiation range AR12). Note that, in the above specific example, the size of the irradiation range AR12 is set based on 1.4 times, but the size thereof may be appropriately set according to a device configuration or the like.

In addition, as shown in FIG. 15, the second light source 12 is preferably arranged such that part of light emitted from the second light source 12 is reflected on the surface of the bulb 112 of the filament lamp serving as the first light source 11, but does not enter the measuring optical system 2120.

Figure 17:
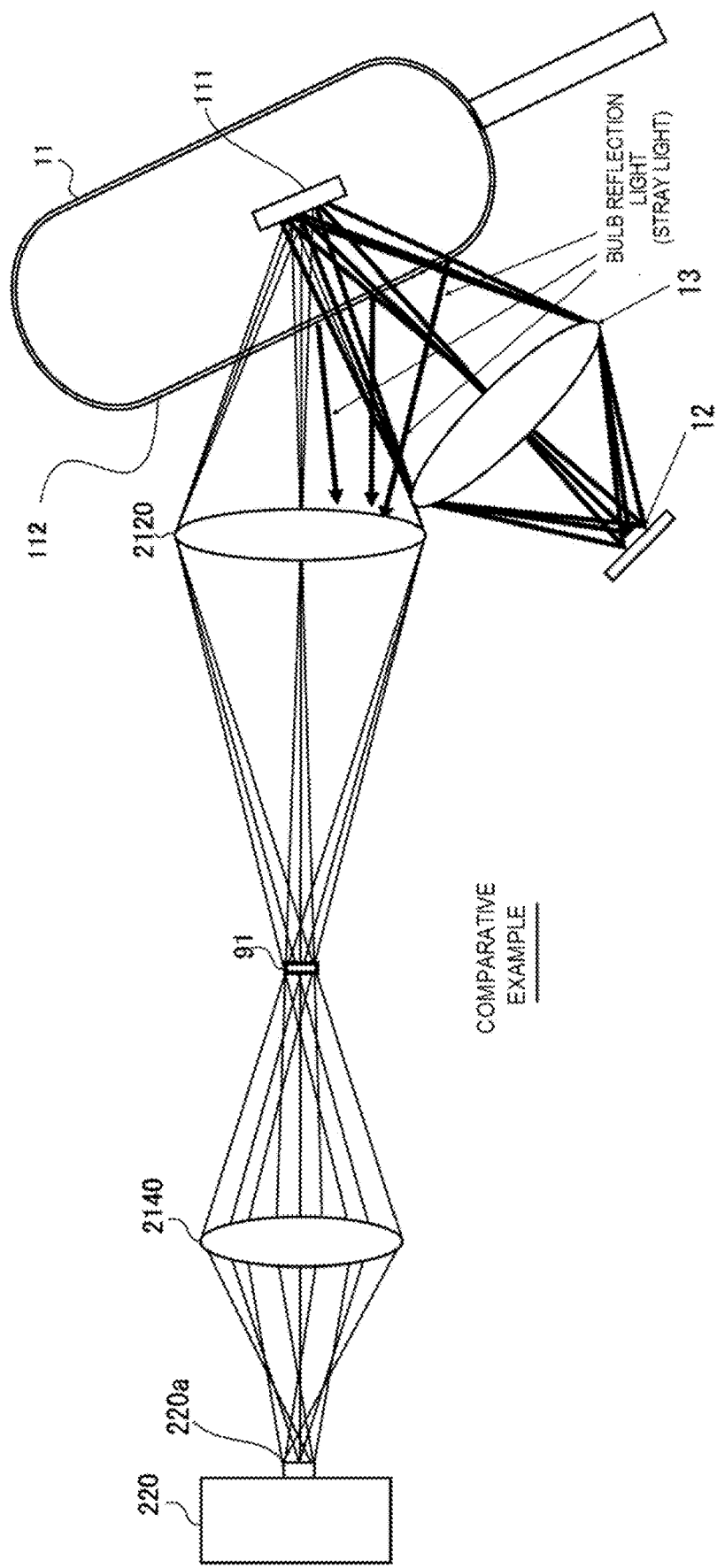
FIG. 17 is a view showing an arrangement example in which surface reflection on the bulb of the filament lamp of a comparative example causes stray light.

For example, as in a comparative example shown in FIG. 17, if part of light emitted from the second light source 12 is reflected on the surface of the bulb 112 and enters the measuring optical system 2120, there are cases where the light enters the detecting device 220 as stray light and measurement accuracy is reduced.

That is, as shown in, e.g., FIG. 15, the optical device according to the present invention is configured such that the reflection on the bulb surface does not cause stray light, and hence it is possible to perform optical measurement with high accuracy.

Figure 18:
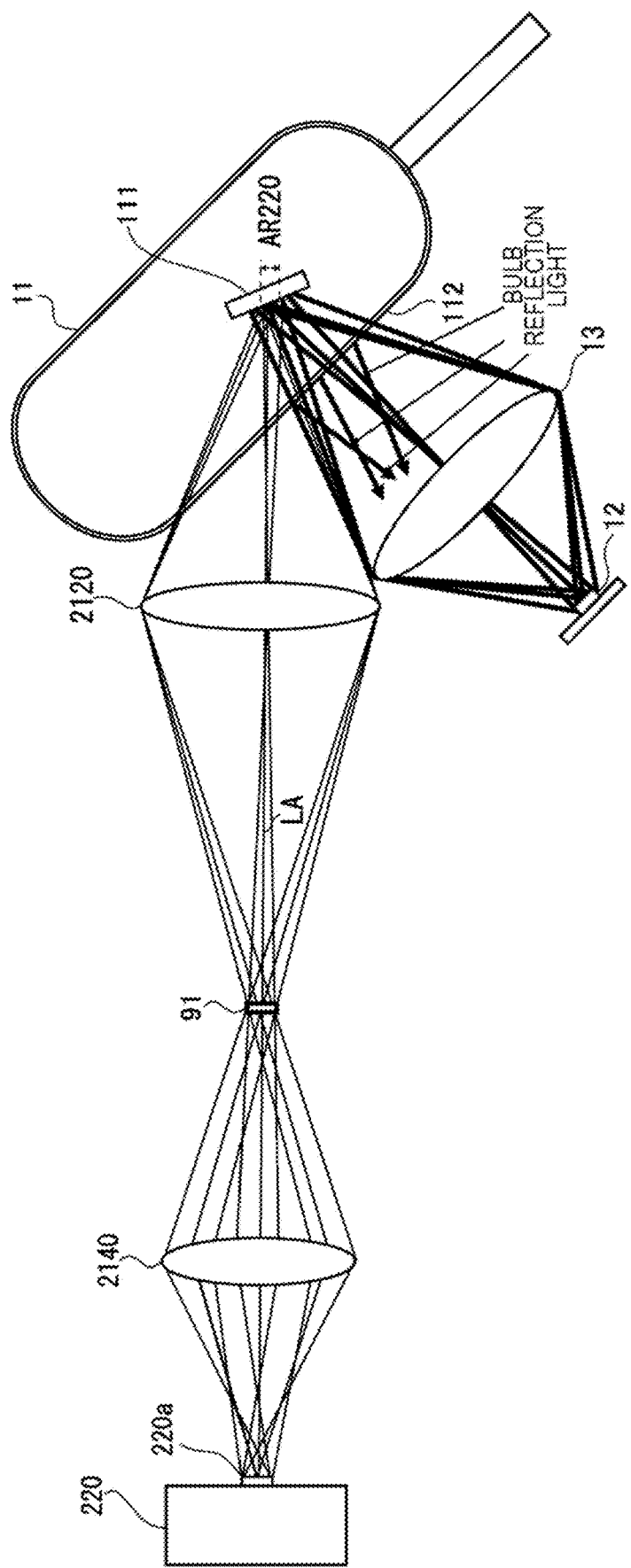
FIG. 18 is a view showing an example of the optical device having the light source device according to the embodiment of the present invention in which an angle of the filament shown in FIG. 15 and an angle of the bulb shown in FIG. 15 are adjusted and stray light is thereby reduced.

FIG. 18 is a view showing an example of the optical device having the light source device according to the embodiment of the present invention and, specifically, as compared with the example shown in FIG. 15, the angle of the filament 111 and the angle of the surface of the bulb 112 are adjusted and stray light is thereby prevented.

Specifically, in the example shown in FIG. 18, as compared with the device in FIG. 15, the filament 111 and the bulb 112 are arranged such that the angle of the surface of the filament 111 with respect to the optical axis LA passing through the sample 91 serving as a measured object is unchanged, and the angle of the surface of the bulb 112 is increased. The first light source 11 shown in FIG. 18 can be implemented by, for example, using the filament lamp in which the filament 111 in the bulb 112 is arranged obliquely to the longer axis of the hollow bulb 112 in a substantially cylindrical shape.

Next, a description will be given of a specific example of the filament lamp serving as the first light source 11 of the light source device.

FIG. 19(a) is a view showing an example of the filament lamp having a flat coil filament, and FIG. 19(b) is a view showing an example of the filament lamp having a double-ended flat coil.

In addition, FIG. 19(c) is a view showing an example of the light source device including the filament lamp shown in FIG. 19(a).

As shown in FIG. 19(a) to FIG. 19(c), in the filament lamp serving as the first light source 11, the filament 111 may be a flat coil. This flat coil filament 111 has a flat surface 111f having a substantially rectangular enveloping surface. The filament 111 is preferably arranged such that light from the second light source 12 is reflected on the flat surface 111f of the flat coil filament 111 and enters the measuring optical system 2120 (a lens or the like). That is, the filament 111 is preferably arranged such that the intensity of the light from the second light source 12 which is reflected on the flat surface 111f of the filament 111 and enters the measuring optical system 2120 (a lens or the like) is maximized. That is, specifically, the reflection is assumed to be direct reflection, and the angle of the flat surface 111f of the filament 111 is set.

FIG. 20(a) is a view showing an example of the filament lamp serving as the first light source 11 which has a round coil filament 111. FIG. 20(b) is a view showing an example of the filament lamp having a double-ended round coil as the filament 111. FIG. 20(c) is a view showing an example of the light source device including the filament lamp shown in FIG. 20(a).

As shown in FIGS. 20(a) to 20(c), in the filament lamp serving as the first light source 11, the filament 111 may be a round coil.

Figure 21:
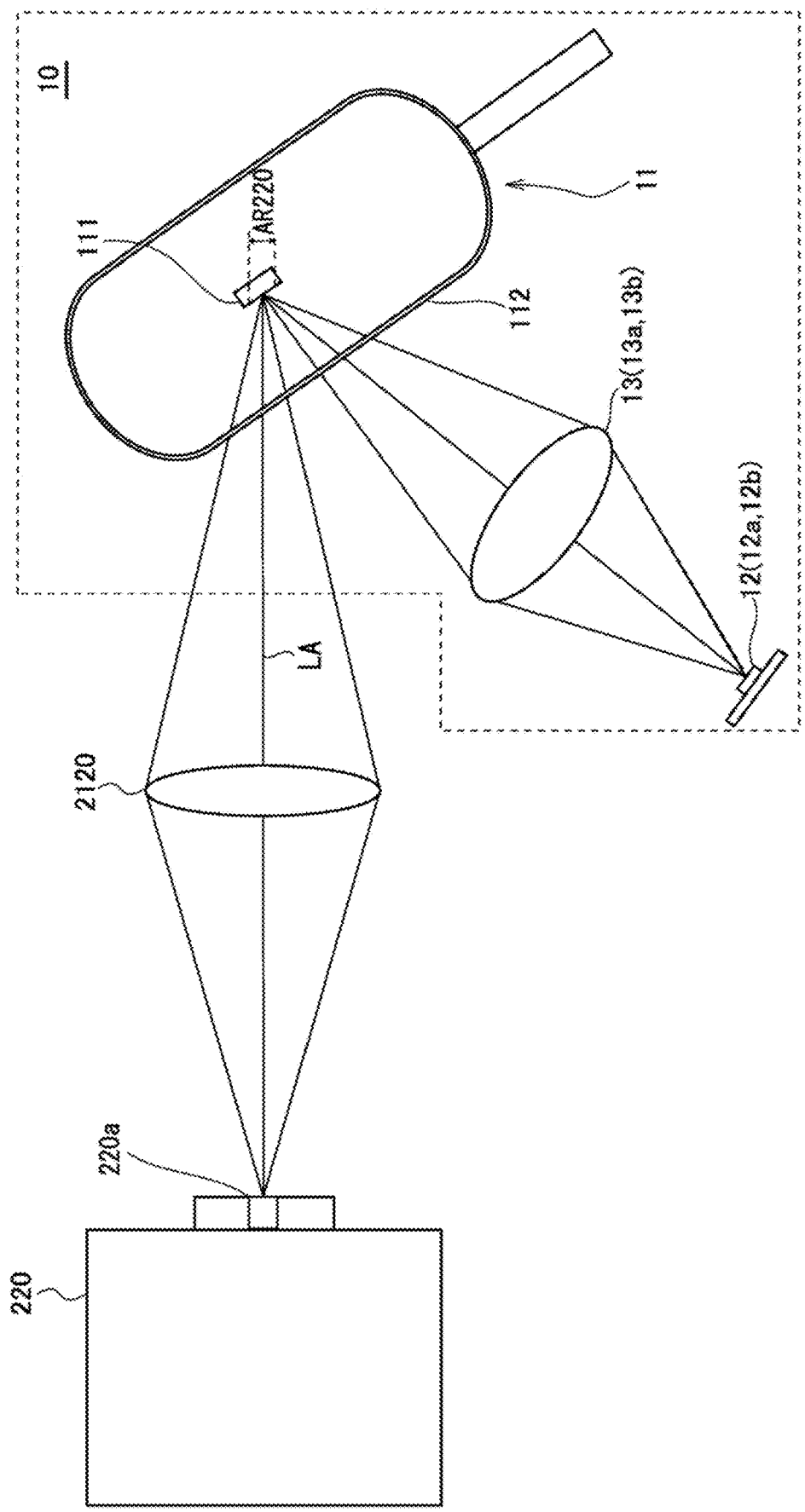
FIG. 21 is a top view showing an example of the optical device including the light source device according to an embodiment of the present invention.
Figure 22:
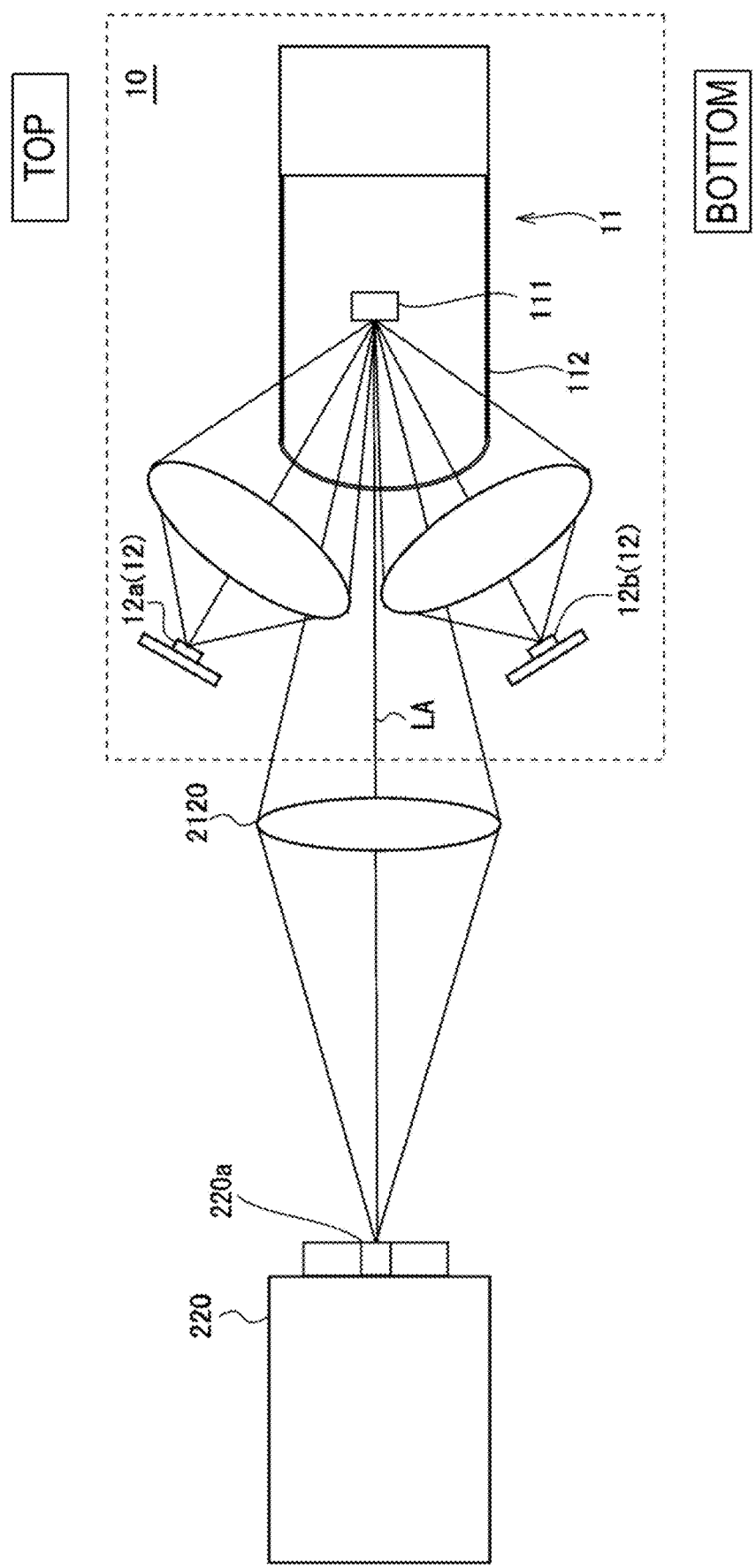
FIG. 22 is a side view showing an example of the optical device including the light source device shown in FIG. 21.

FIG. 21 is a top view showing an example of the optical device 100 including the light source device 10 according to an embodiment of the present invention. FIG. 22 is a side view of the optical device 100 including the light source device 10 shown in FIG. 21.

The light source device 10 shown in each of FIGS. 21 and 22 has LED light sources serving as second light sources 12 (12a, 12b) arranged to be spaced apart from each other by a predetermined distance in a vertical direction. The filament 111 of the filament lamp serving as the first light source 11 is irradiated with lights having different wavelengths emitted from the second light sources 12a and 12b via condensing lenses 13 (13a, 13b) serving as the condensing optical systems. Combined light of light by heating and light emitting of the filament 111 and light by diffuse reflection of lights from the second light sources 12a and 12b enters, from the first light source 11, the irradiated object (sample) and the optical measuring part (detecting device 220) via the measuring optical system 2120 (a lens or the like).

The second light sources 12 are not limited to the above-described embodiment and, for example, a plurality of semiconductor light sources may also be arranged along the vertical direction.

<First Light Source is a Semiconductor Light Source Which Emits White Light, and Second Light Source is a Semiconductor Light Source Which Emits Narrowband Light>

Next, a description will be given of a light source device 10C of the optical device according to an embodiment of the present invention.

Figure 23:
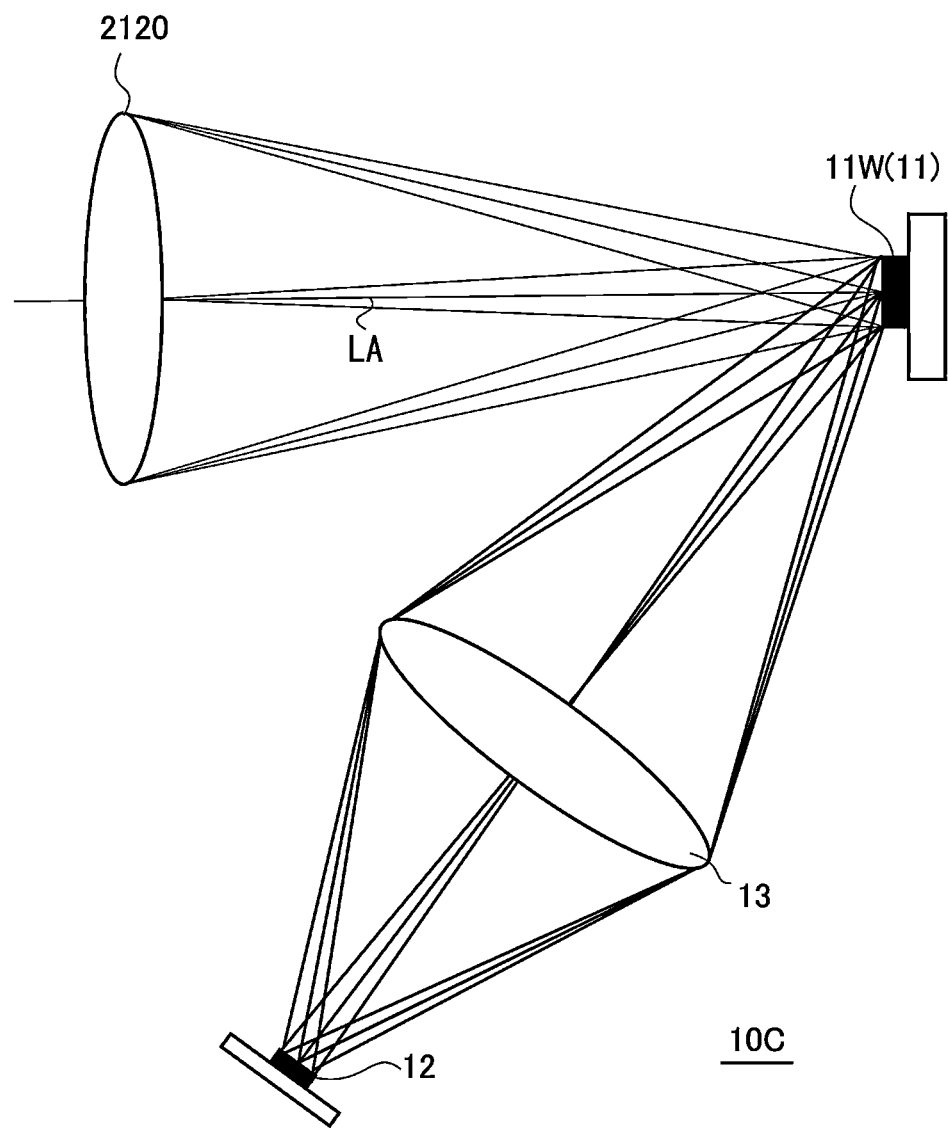
FIG. 23 is a view showing an example of the light source device which irradiates a white LED with light by a UV wavelength LED, and emits combined light of light reflected on the white LED and light from the white LED.

In the present embodiment, as shown in FIG. 23, a white LED serving as the first light source 11 (11W) which is turned on is irradiated with narrowband light from a UV wavelength LED or the like serving as the second light source 12, and combined light of light reflected on the first light source 11W and light by light emission of the first light source 11W itself which is turned on is emitted to the irradiated object (not shown) and the optical measuring part (detecting device 220) via the measuring optical system 2120 (a lens or the like).

That is, a light emitting surface of the white LED which is turned on is irradiated with LED light having a UV wavelength, and combined light in which UV scattered light is added to white light is emitted from the first light source 11W to the irradiated object.

Figure 24:
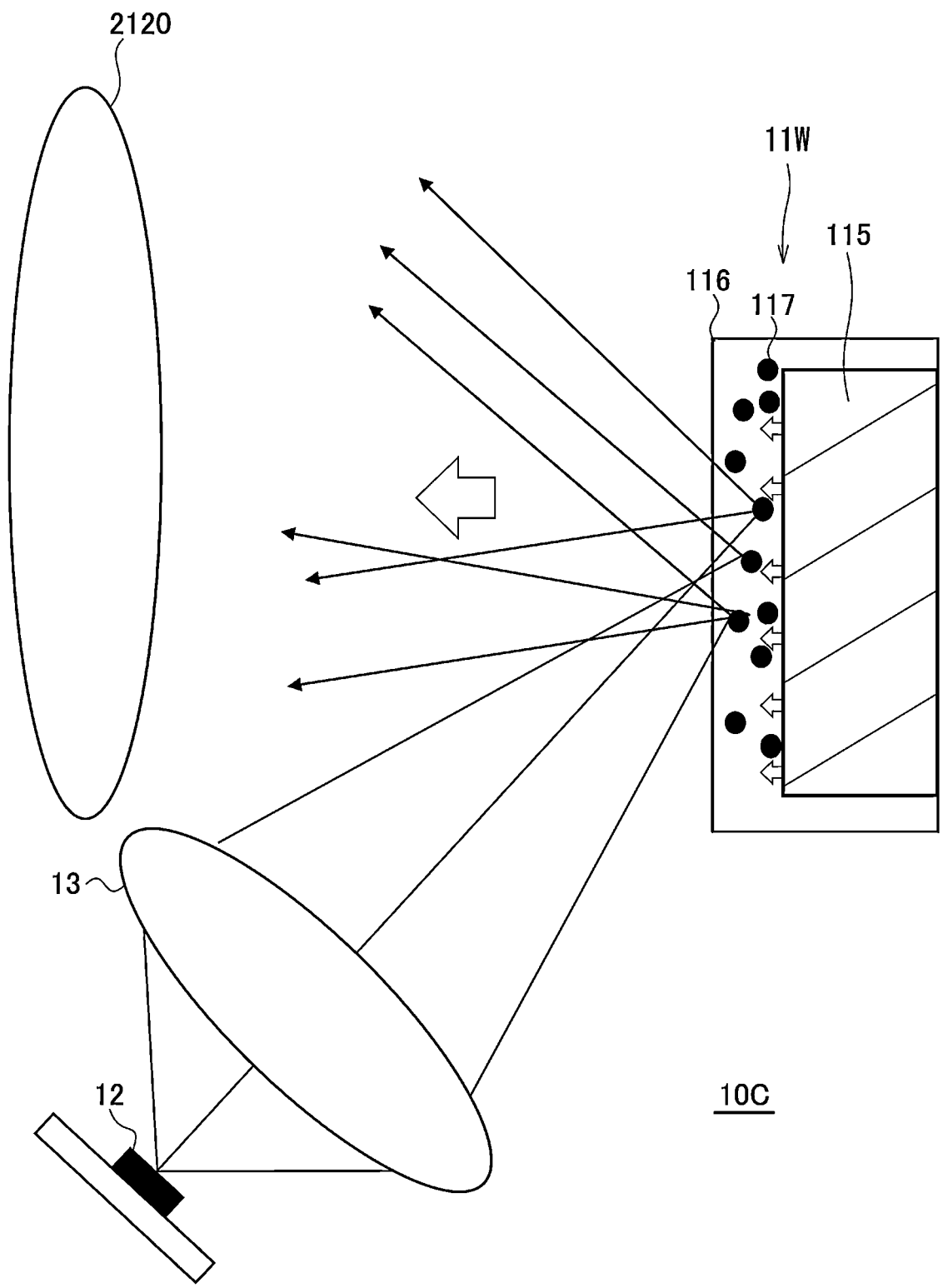
FIG. 24 is a view for explaining synthetic light of the light source device shown in FIG. 23.

FIG. 24 is a view for explaining synthetic light of the light source device 10C shown in FIG. 23.

As shown in FIG. 24, the white LED serving as the first light source 11W of the light source device 10C has, e.g., a blue LED 115 which emits blue light, and a light transmitting sealing member 116 including a plurality of phosphor particles 117 is provided on a light emitting surface side (light emission surface side) of the blue LED 115.

The sealing member 116 is constituted of a light transmitting resin material such as a polymer resin.

As the phosphor particle 117, it is possible to use a yellow phosphor, the yellow phosphor and a red phosphor, and a green phosphor and the red phosphor.

The phosphor particle 117 has a substantially spherical shape having an average particle diameter of about 10 μm. Air (refractive index is about 1), the sealing member 116 (refractive index is 1.3 to 1.5), and the phosphor particle 117 have different refractive indices, and a specific amount of light is reflected at their interfaces according to the refractive indices. Depending on an angle of incidence, total reflection occurs at the interface.

In the first light source 11W, when it is turned on, the phosphor particles 117 are irradiated with blue light emitted from the blue LED 115, the phosphor particles 117 are excited to emit light having a predetermined wavelength such as yellow, red, or green light, and white light is emitted from the first light source 11W.

In addition, the first light source 11W is irradiated with light from the second light source 12 directly or via the condensing optical system (the condensing lens 13 or the like), and the light from the second light source 12 is diffused and reflected by the phosphor particles 117.

That is, from the first light source 11W, combined light of light from the second light source 12 which is diffused and reflected by the phosphor particles 117, light emitted from the blue LED 115, and light excited by the phosphor particles 117 is emitted.

Note that the first light source 11W may use an LED light source having a wavelength shorter than that of blue instead of the blue LED 115.

In the embodiment described above, while the sealing member 116 includes the plurality of phosphor particles 117, the present invention is not limited thereto and, for example, the phosphor particles 117 may also be directly applied to the light emitting surface of the blue LED.

The inventors of the present application fabricated the light source device having the white LED serving as the first light source 11W and the UV wavelength LED serving as the second light source 12 which emitted light having a wavelength of 340 nm of the UV wavelength LED, and performed spectrum analysis by receiving combined light emitted from the above light source device with a light receiving device.

Figure 25:
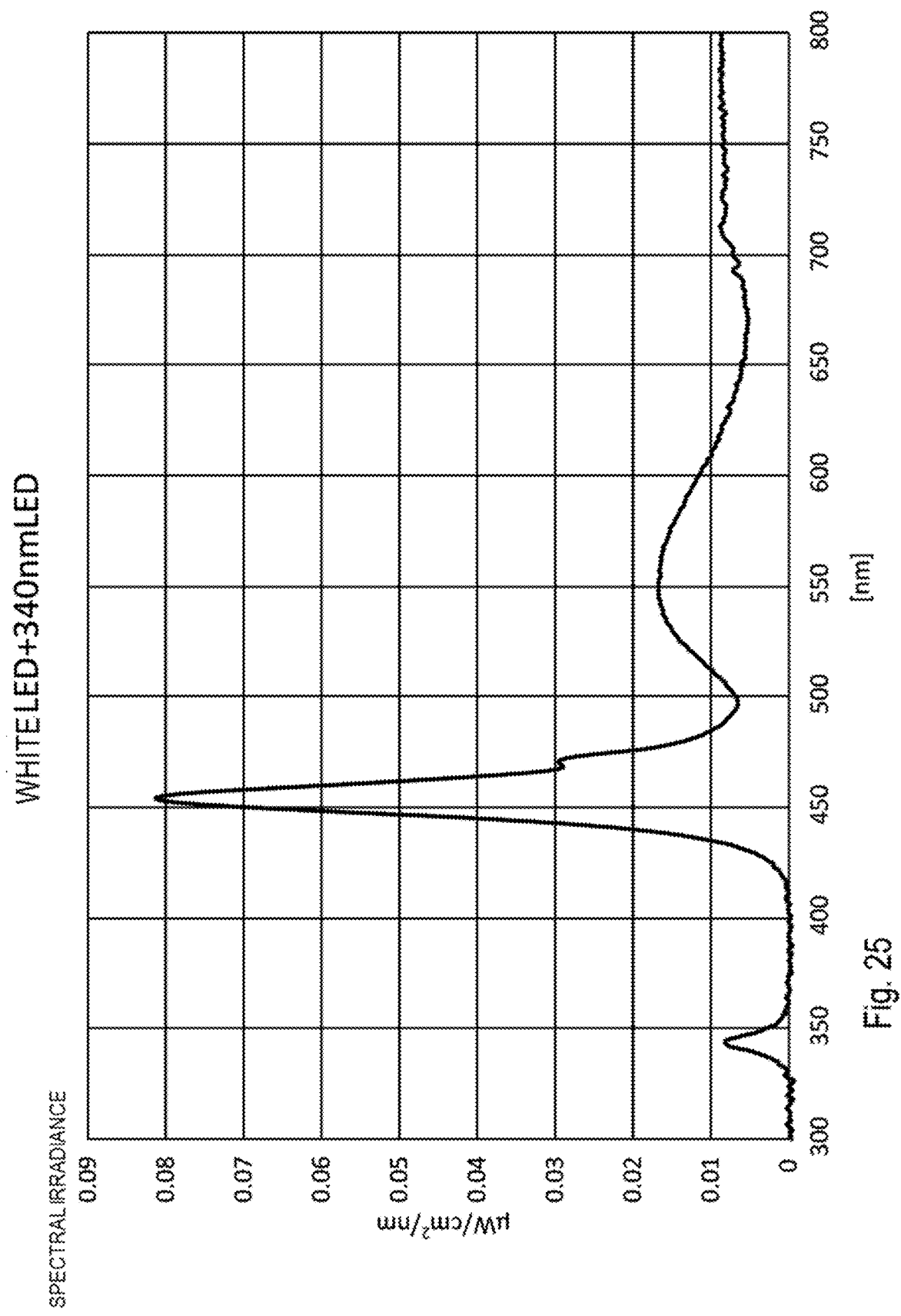
FIG. 25 is a view showing a measurement result of the combined light from the light source device shown in FIG. 23.
Figure 26:
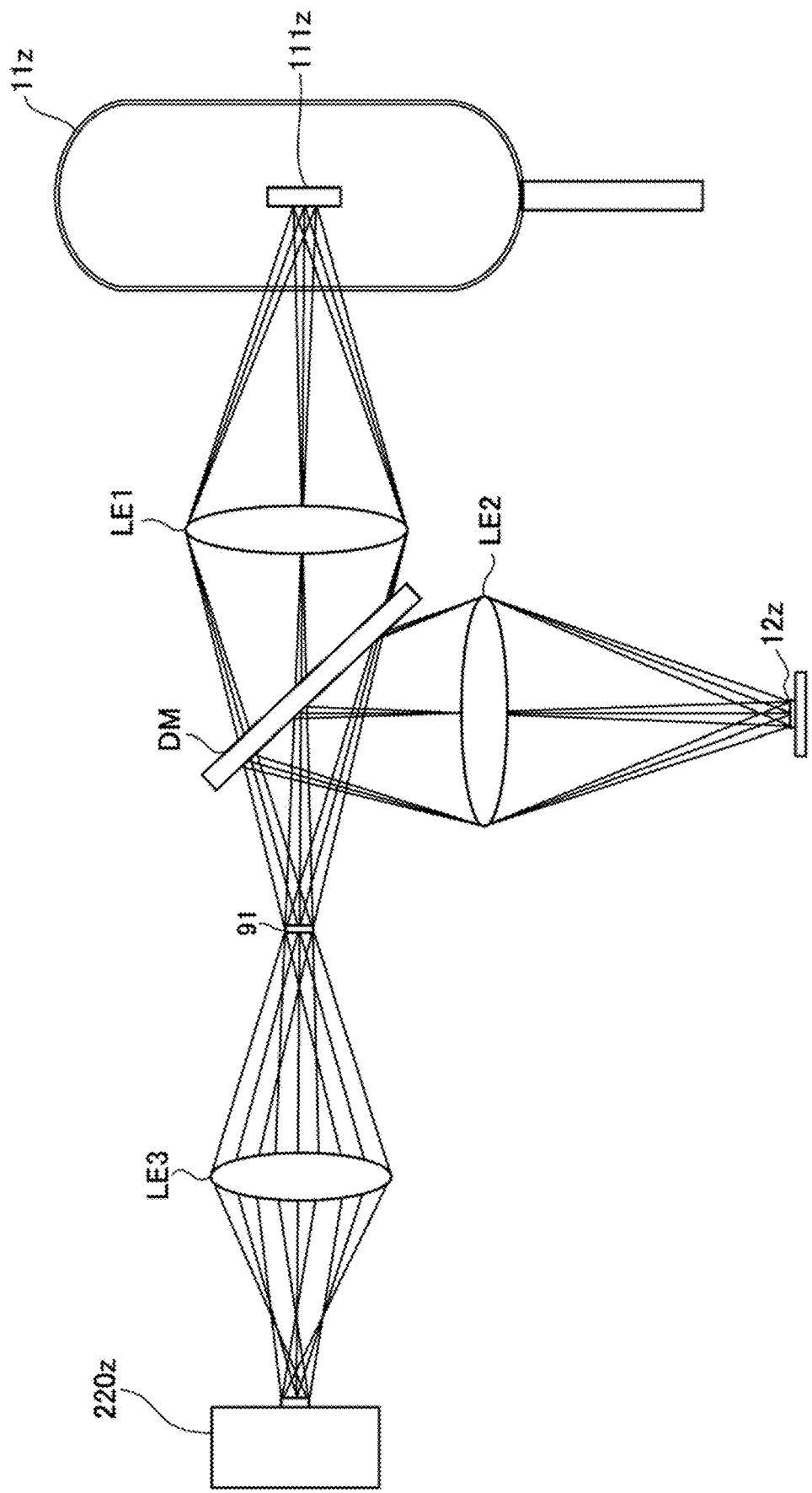
FIG. 26 is a view showing an optical device (conventional art) having a dichroic mirror.

FIG. 25 is a view showing a measurement result of the combined light from the light source device shown in FIG. 23. In FIG. 25, the horizontal axis indicates the wavelength, and the vertical axis indicates spectral irradiance.

In the combined light, as compared with the spectrum of the white LED alone, the intensity of light is increased in the vicinity of a wavelength of 340 nm. That is, it was possible to observe the combined light of light having the wavelength of 340 nm from the second light source 12 and light of the white LED alone.

Thus, as described above, the light source device 10 according to the embodiment of the present invention has the first light source 11 (the filament lamp or the semiconductor light source), and the second light source 12 (the semiconductor light source) capable of irradiating the first light source 11 with light having a wavelength band narrower than the wavelength band of light by the first light source 11, and the first light source 11 is configured to emit combined light of light from the first light source 11 and light from the second light source 12 which is diffused and reflected on the surface of the first light source 11 to the irradiated object.

In addition, the first light source 11 of the light source device is arranged on the optical axis (LA) which passes through the irradiated object.

That is, it is possible to provide the light source device capable of emitting combined light of light from the first light source 11 and narrowband light from the second light source 12 to the irradiated object with a simple structure without needing to perform complicated optical axis adjustment.

In other words, it is possible to provide the light source device capable of handling the combined light of the light from the first light source and the narrowband light from the second light source as if the combined light were single light from the first light source with the simple structure of which accuracy is not required.

In addition, it is possible to provide the optical device including the light source device.

In addition, the light source device 10 according to the embodiment of the present invention has the first light source 11 (the filament lamp such as the halogen lamp or the incandescent lamp) which includes the filament 111 capable of heating and light emitting (capable of high temperature light emitting) by electrification, and the second light source 12 (the semiconductor light source such as the LED element, the LD element, or the organic EL element) capable of irradiating the filament 111 of the first light source 11 with light having a wavelength in a band narrower than that of the wavelength of light by heating and light emitting of the first light source. The first light source 11 is configured to emit, at least from the filament 111, combined light of light from the filament 111 in the state of heating and light emitting (high temperature light emitting state) and light from the second light source 12 which is diffused and reflected on the surface of the filament 111.

The spectrum of the filament lamp is determined by the temperature of the filament 111 according to light emission principles of black body radiation. For example, even in the case where the current value of a current passed through the filament 111 is reduced to be lower than a normal specified value (or a maximum specified value) and, with regard to light from the filament 111 in the state of heating and light emitting by electrification of the first light source 11, the intensity of light in a desired wavelength region is low (the light amount is small), in the light source device 10 according to the present invention, light in the desired wavelength region emitted from the second light source 12 is reflected on the surface of the filament in the state of heating and light emitting, and combined light of the reflection light and light by high temperature light emitting of the filament 111 can be emitted from the filament 111, and hence it is possible to provide the light source device 10 capable of emitting light having an associated wave in which light by heating and light emitting of the electrified filament of the first light source 11 is supplemented with the intensity of light in the desired wavelength region by the second light source 12 with a simple configuration.

In addition, in the light source device 10 according to the present invention, the filament 111 of the first light source 11 is irradiated with light emitted from the second light source 12, and combined light of light reflected on the filament 111 and light from the filament 111 in the state of heating and light emitting by electrification is emitted from the filament 111, and hence, as compared with the light source device (comparative example) which combines LED light and light from the filament with, e.g., a mirror or a dichroic filter which reflects only the LED light, it is not necessary to provide a complicated structure for optical alignment or the like, it is not necessary to perform adjustment such as optical axis alignment, and it is possible to emit the combined light from the filament 111 with a simple configuration.

That is, in the light source device 10 according to the present invention, a light emitting position is a single position, i.e., the combined light of emitted light and reflection light is emitted at the position of the filament 111, and hence a problem associated with, e.g., optical axis displacement caused by a plurality of light sources does not occur.

In addition, for example, as a comparative example, in a device which includes a plurality of light sources, combines lights having different wavelengths with a dichroic filter or the like, and emits the combined light, replacement is performed for each wavelength band, and hence there is a possibility that a reduction in intensity may occur in a wavelength region in the vicinity of an interface of lights having different wavelengths (due to the filter).

On the other hand, in the light source device 10 according to the present invention, as described above, by irradiating the filament 111 of the first light source 11 with the light from the second light source 12 and causing the light from the second light source 12 to be reflected, the combined light of the reflection light and the light by high temperature light emitting from the first light source 11 is emitted, and hence the intensity of the wavelength region of the combined light is obtained by simple addition of the intensity of the wavelength region of the reflection light and the intensity of the wavelength region of the light from the filament in the high temperature light emission, and, as a result, the reduction in intensity in the above comparative example does not occur.

In addition, in the case where the filament lamp such as the halogen lamp or the incandescent lamp is used as the first light source 11, when the filament temperature is reduced in order to increase the life of the filament lamp, an intensity particularly in a short wavelength band is reduced. The light source device 10 according to the embodiment of the present invention has the above-described second light source 12, and hence it is possible to compensate the low intensity in the wavelength band.

That is, it is possible to meet optical requirements and implement the light source device 10 having a long life with a simple configuration.

In addition, the light source device 10 according to the embodiment of the present invention has the condensing optical system (the condensing lens 13 or the reflecting part 14 (mirror)) which is arranged between the filament 111 of the first light source 11 and the second light source 12, and condenses light emitted from the second light source 12 on whole or a part of the filament 111.

That is, with a simple configuration, it is possible to reliably irradiate the filament 111 with the light emitted from the second light source 12, and it is possible to obtain desired combined light.

Further, the second light source 12 of the light source device 10 according to the embodiment of the present invention is the semiconductor light source capable of emitting light in a desired wavelength region such as the LED light source, the LD light source, or the organic EL light source, and hence it is possible to manufacture the light source device 10 having a simple configuration inexpensively with the filament lamp serving as the first light source 11 and the semiconductor light source serving as the second light source 12.

In addition, in the light source device according to the embodiment of the present invention, the first light source 11 is the semiconductor light source (the semiconductor light source such as the LED light source, the LD light source, or the organic EL light source) which emits white light, and the second light source 12 is the semiconductor light source capable of irradiating the first light source 11 with light having a wavelength band narrower than a wavelength band of light by the first light source 11, whereby it is possible to manufacture the light source device capable of emitting the combined light in a desired wavelength band with a simple configuration inexpensively.

Further, the second light source 12 of the light source device 10 according to the embodiment of the present invention may include a plurality of semiconductor light sources capable of emitting lights having different peak wavelengths or different center wavelengths.

That is, the second light source 12 can emit desired combined light from the filament 111 of the first light source 11 by irradiating the filament 111 with light emitted from one or a plurality of semiconductor light sources which emit lights having peak wavelengths or center wavelengths required for, e.g., optical measurement.

The optical device 100 according to the embodiment of the present invention has the light source device 10, and the optical measuring part (detecting device 220) which performs optical measurement of the irradiated object by using combined light from the light source device 10.

That is, by setting the intensity of the wavelength band of combined light emitted from the above light source device 10 to the intensity which is sufficient for the optical measurement by the optical measuring part, it is possible to provide the optical device 100 capable of performing the optical measurement with high accuracy with the optical measuring part (detecting device 220).

In addition, the first light source 11 is preferably arranged on the optical axis (LA) which passes through the irradiated object (measuring object) and the optical measuring part (detecting device 220).

Note that contribution to an increase in the temperature of the filament 111 obtained by irradiating the filament 111 with light emitted from the semiconductor light source serving as the second light source 12 is zero or very small.

Thus, the embodiments of the present invention have been described in detail with reference to the drawings, but the specific configuration is not limited to these embodiments, and design changes and the like made within the scope which does not depart from the gist of the present invention are included in the present invention.

In addition, with regard to the embodiments shown in the above individual drawings, the descriptions of the embodiments can be combined as long as there is no inconsistency or problem in the purpose and the configuration.

Further, the descriptions of the individual drawings can be embodiments which are independent of each other, and the embodiments of the present invention are not limited to one embodiment made up of a combination of the individual drawings.

Note that the life of the semiconductor light source serving as the second light source 12 can be reduced by high heat, and hence heat interrupting means which transmits light from the second light source, and interrupts or reduces heat from the first light source 11 such as, e.g., a light transmitting insulating member or a filter may be provided between the second light source 12 and the first light source 11. In addition, as the heat interrupting means, a condensing optical system for condensing light from the semiconductor light source on the filament 111, e.g., a condensing lens or a reflecting member may have an insulation function.

In addition, a light guiding member may be provided between the second light source 12 and the first light source 11, and light emitted from the second light source 12 may be guided to the filament 111 of the first light source 11 by the light guiding member. This light guiding member may be a light guiding plate made of resin or the like, or an optical fiber.

Further, the light source device 10 according to the present invention may be configured such that light emitted from the second light source 12 and reflected on the bulb 112 is combined with combined light emitted from the above filament 111, and the irradiated object is irradiated with the light combined with the combined light.

That is, it is possible to increase the intensity of the combined light with a simple configuration.

In addition, the light source device 10 according to the present invention may have irradiation region adjusting means capable of adjusting a region of the filament 111 irradiated with light emitted from the second light source 12 by reducing or enlarging the region thereof. The irradiation region adjusting means may be, e.g., one or a plurality of optical lens systems capable of adjusting focal length.

Further, the light source device according to the present invention may have a light detecting part which detects the intensity of combined light from the filament of the first light source 11 or the irradiation region, and the light source control part may adjust the irradiation region with the irradiation region adjusting means based on a detection signal from the light detecting part. That is, it is possible to optimally adjust the intensity of the predetermined wavelength region of the combined light.

In addition, the light source device 10 according to the present invention may have light transmitting insulating means between the first light source 11 and the second light source 12. That is, it is possible to prevent thermal degradation of the semiconductor light source serving as the second light source 12 with the insulating means. The function of the insulating means may also be provided in the condensing lens 13 or the reflecting part 14.

REFERENCE SIGNS LIST

10 Light source device
11 First light source (filament lamp, semiconductor light source)

12 Second light source (semiconductor light sources such as LED light source, LD light source, and organic EL light source)
13 Condensing lens (condensing optical system, irradiation region adjusting means)
14 Reflecting part
15 Light receiving part
16 Display input part (display part and input part)
18 Light source control part
91 Sample (irradiated object)
100 Optical device (optical measuring device and the like)
111 Filament
112 Bulb
112Ra First light transmission part
112Rb Second light transmission part
211 Filter
212 Lens
220 Detecting device (optical measuring part)

What is claimed is:

1. An optical measuring device which measures absorbance of a measuring object at a plurality of wavelengths, the optical measuring device comprising:
a light source device; and
a detector which irradiates the measuring object with light from the light source device, disperses light transmitted from the measurement object with a wavelength dispersion element, and measures intensity of each wavelength of the dispersed light
wherein: the light source device has a first light source, a second light source, and a light source control part which drives the first light source and the second light source,
the first light source is a halogen lamp or an incandescent lamp and part of an irradiation range serves as an effective utilization range utilized in the optical measurement;
the second light source is a semiconductor light source capable of irradiating a filament of the first light source with light in a short wavelength band;
the light source control part performs heating and light emitting drive of the first light source,
the light source control part performs control of the light in the short wavelength band emitted from the second light source so that an intensity required for the optical measurement is obtained and performs feedback control of the second light source based on at least one of drive current and temperature so that stability of the light emitted from the second light source required for the light measurement is obtained;
the light source device irradiates the measuring object with combined light of light from the first light source and light, which is from the second light source, and which is radiated to the filament, and is thereby diffused and reflected on a surface of the filament;
and the light source control part performs control which switches between a first mode in which a current having a first current value is applied to the filament of the first light source and the second light source is brought into a non-driving state, and a second mode in which a current having a second current value which is less than the first current value is applied to the filament of the first light source and the filament is irradiated with light emitted from the second light source by bringing the second light source into a driving state.

2. The optical measuring device according to claim 1, wherein
the first light source further has a bulb having a light transmission part,
the filament is accommodated in the bulb,
the light source device further has a condensing optical system which is arranged between the filament of the first light source and the second light source, condenses the light from the second light source, and irradiates whole or a part of the filament of the first light source with the condensed light through the light transmission part of the bulb of the first light source, and
the first light source irradiates the measuring object through the light transmission part of the bulb with combined light of light from the filament in a state of heating and light emitting and light which is diffused and reflected on the surface of the filament which is irradiated with light transmitted through the condensing optical system from the second light source.

3. The optical measuring device according to claim 2, wherein
the condensing optical system is configured such that an irradiation region in the filament of the first light source, which is irradiated with light from the second light source through the condensing optical system and the light transmission part of the bulb, is larger than the effective utilization range in the filament which is utilized in measurement by the optical measuring part.

4. The optical measuring device according to claim 3, wherein
the second light source is constituted of a plurality of semiconductor light sources capable of emitting lights having different peak wavelengths or different center wavelengths.

5. The optical measuring device according to claim 2, wherein the reduction tool of fluctuation over time controls a drive current to the second light source such that a light emission intensity of the second light source becomes equal to a set value, based on a detection result of a light receiving part which detects the light from the second light source.

6. The optical measuring device according to claim 5, wherein
the second light source is constituted of a plurality of semiconductor light sources capable of emitting lights having different peak wavelengths or different center wavelengths.

7. The optical measuring device according to claim 2, wherein the light source device further has a light receiving part which detects the light from the first light source and the light from the second light source, and the light source control part controls a drive current to the second light source such that a light intensity at a wavelength used in measurement of the absorbance of the measuring object by the optical measuring part becomes equal to an intensity required for the optical measurement, based on a detection result of the light receiving part.

8. The optical measuring device according to claim 7, wherein
the second light source is constituted of a plurality of semiconductor light sources capable of emitting lights having different peak wavelengths or different center wavelengths.

9. The optical measuring device according to claim 1, wherein
the reduction tool of fluctuation over time controls a drive current to the second light source such that a light emission intensity of the second light source becomes equal to a set value, based on a detection result of a light receiving part which detects the light from the second light source.

10. The optical measuring device according to claim 9, wherein
the second light source is constituted of a plurality of semiconductor light sources capable of emitting lights having different peak wavelengths or different center wavelengths.

11. The optical measuring device according to claim 1, wherein
the light source device further has a light receiving part which detects the light from the first light source and the light from the second light source, and
the light source control part controls a drive current to the second light source such that a light intensity at a wavelength used in measurement of the absorbance of the measuring object by the optical measuring part becomes equal to an intensity required for the optical measurement, based on a detection result of the light receiving part.

12. The optical measuring device according to claim 11, wherein
the second light source is constituted of a plurality of semiconductor light sources capable of emitting lights having different peak wavelengths or different center wavelengths.

13. The optical measuring device according to claim 1, wherein the reduction tool of fluctuation over time controls a drive current to the second light source such that a light emission intensity of the second light source becomes equal to a set value, based on a detection result of a light receiving part which detects the light from the second light source.

14. The optical measuring device according to claim 13, wherein
the second light source is constituted of a plurality of semiconductor light sources capable of emitting lights having different peak wavelengths or different center wavelengths.

15. The optical measuring device according to claim 1, wherein the light source device further has a light receiving part which detects the light from the first light source and the light from the second light source, and the light source control part controls a drive current to the second light source such that a light intensity at a wavelength used in measurement of the absorbance of the measuring object by the optical measuring part becomes equal to an intensity required for the optical measurement, based on a detection result of the light receiving part.

16. The optical measuring device according to claim 15, wherein
the second light source is constituted of a plurality of semiconductor light sources capable of emitting lights having different peak wavelengths or different center wavelengths.

17. A light source device comprising,
a detector which irradiates the measuring object with light from the light source device, disperses light transmitted from the measurement object with a wavelength dispersion element, and measures intensity of each wavelength of the dispersed light,
wherein: the light source device has a first light source, a second light source, and a light source control part which drives the first light source and the second light source,
the first light source is a halogen lamp or an incandescent lamp and part of an irradiation range serves as an effective utilization range utilized in the optical measurement;
the second light source is a semiconductor light source capable of irradiating a filament of the first light source with light in a short wavelength band;
the light source control part performs heating and light emitting drive of the first light source;
the light source control part performs control of the light in the short wavelength band emitted from the second light source so that an intensity required for the optical measurement is obtained and performs feedback control of the second light source based on at least one of drive current and temperature so that stability of the light emitted from the second light source required for the light measurement is obtained;
the light source device irradiates the measuring object with combined light of light from the first light source and light, which is from the second light source, and which is radiated to the filament, and is thereby diffused and reflected on a surface of the filament;
and the light source control part performs control which switches between a first mode in which a current having a first current value is applied to the filament of the first light source and the second light source is brought into a non-driving state, and a second mode in which a current having a second current value which is less than the first current value is applied to the filament of the first light source and the filament is irradiated with light emitted from the second light source by bringing the second light source into a driving state.

18. The light source device according to claim 8,
the first light source further has a bulb having a light transmission part,
the filament is accommodated in the bulb,
the light source device further has a condensing optical system which is arranged between the filament of the first light source and the second light source, condenses the light from the second light source, and irradiates whole or a part of the filament of the first light source with the condensed light through the light transmission part of the bulb of the first light source, and
the first light source irradiates the measuring object through the light transmission part of the bulb with combined light of light from the filament in a state of heating and light emitting and light which is diffused and reflected on the surface of the filament which is irradiated with light transmitted through the condensing optical system from the second light source.

* * * * *